United States Patent
Bondesen et al.

(10) Patent No.: US 9,721,268 B2
(45) Date of Patent: Aug. 1, 2017

(54) PROVIDING OFFERS ASSOCIATED WITH PAYMENT CREDENTIALS AUTHENTICATED IN A SPECIFIC DIGITAL WALLET

(71) Applicant: BANK OF AMERICA CORPORATION, Charlotte, NC (US)

(72) Inventors: Laura Corinne Bondesen, Charlotte, NC (US); Jason P. Blackhurst, Charlotte, NC (US); Scott Lee Harkey, Concord, NC (US); William Blakely Belchee, Charlotte, NC (US); Tammy L. Brunswig, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 640 days.

(21) Appl. No.: 14/196,869

(22) Filed: Mar. 4, 2014

(65) Prior Publication Data
US 2015/0254698 A1 Sep. 10, 2015

(51) Int. Cl.
*G06Q 20/00* (2012.01)
*G06Q 30/02* (2012.01)
(Continued)

(52) U.S. Cl.
CPC ......... *G06Q 30/0215* (2013.01); *G06Q 20/02* (2013.01); *G06Q 20/20* (2013.01);
(Continued)

(58) Field of Classification Search
USPC .......... 706/16, 21, 59, 71; 380/44, 262, 278, 380/279
See application file for complete search history.

(56) References Cited

U.S. PATENT DOCUMENTS 3,307,412 A 3/1967 Granqvist
3,352,730 A 11/1967 Murch, Jr.
(Continued)

FOREIGN PATENT DOCUMENTS

WO WO 2012058099 5/2012
WO WO 2013095486 6/2013

OTHER PUBLICATIONS

European Patent Application No. 01400506 filed on Feb. 28, 2001, and printed as document No. EP 1132876 A2 entitled "Electronic Wallet System with Secure Inter-purse Operations" by inventor Tang-Talpin et al.
(Continued)

*Primary Examiner* — Dante Ravetti
(74) *Attorney, Agent, or Firm* — Michael A. Springs; Moore & Van Allen PLLC; Peter B. Stewart

(57) ABSTRACT

Embodiments of the invention are directed to systems, methods and computer program products for providing supplemental account information in digital wallets. An exemplary apparatus is configured to: receive a request to provide a digital wallet on a user's mobile device, authenticate at least one payment credential for use within the digital wallet; receive access to an application programming interface configured to push offers to digital wallets, wherein the application programming interface is associated with at least one database maintained by the digital wallet provider; receive, via the application programming interface one or more offers from the at least one database, wherein the offers include at least one incentive for processing payments using the at least one payment credential associated with the digital wallet; and present, to the user on a display of the mobile device, the one or more offers.

18 Claims, 7 Drawing Sheets

(51) Int. Cl.
  *G06Q 20/32* (2012.01)
  *G06Q 20/36* (2012.01)
  *G06Q 20/02* (2012.01)
  *G06Q 20/20* (2012.01)
  *G06Q 20/38* (2012.01)

(52) U.S. Cl.
  CPc ....... *G06Q 20/322* (2013.01); *G06Q 20/3278* (2013.01); *G06Q 20/36* (2013.01); *G06Q 20/367* (2013.01); *G06Q 20/385* (2013.01)

(56) References Cited

U.S. PATENT DOCUMENTS

| | | |
|---|---|---|
| 4,766,293 A | 8/1988 | Boston |
| 5,438,186 A | 8/1995 | Nair et al. |
| 6,119,103 A | 9/2000 | Basch et al. |
| 6,254,000 B1 | 7/2001 | Degen et al. |
| 6,256,670 B1 | 7/2001 | Davies |
| 6,330,546 B1 | 12/2001 | Gopinathan et al. |
| 6,422,462 B1 | 7/2002 | Cohen |
| 6,516,056 B1 | 2/2003 | Justice et al. |
| 6,658,393 B1 | 12/2003 | Basch et al. |
| 6,718,328 B1 | 4/2004 | Norris |
| 7,111,323 B1 | 9/2006 | Bhatia et al. |
| 7,136,835 B1 | 11/2006 | Flitcroft et al. |
| 7,177,838 B1 | 2/2007 | Ling |
| 7,328,189 B2 | 2/2008 | Ling |
| 7,337,144 B1 | 2/2008 | Blinn et al. |
| 7,398,250 B2 | 7/2008 | Blinn et al. |
| 7,596,530 B1 | 9/2009 | Glasberg |
| 7,606,560 B2 | 10/2009 | Labrou et al. |
| 7,610,040 B2 | 10/2009 | Cantini et al. |
| 7,627,505 B2 | 12/2009 | Yoshida et al. |
| 7,657,489 B2 | 2/2010 | Stambaugh |
| 7,693,771 B1 | 4/2010 | Zimmerman et al. |
| 7,698,221 B2 | 4/2010 | Blinn et al. |
| 7,698,443 B2 | 4/2010 | Yaffe et al. |
| 7,739,169 B2 | 6/2010 | Hammad |
| 7,742,967 B1 | 6/2010 | Keresman, III et al. |
| 7,784,684 B2 | 8/2010 | Labrou et al. |
| 7,848,980 B2 | 12/2010 | Carlson |
| 7,992,779 B2 | 8/2011 | Phillips et al. |
| 8,032,932 B2 | 10/2011 | Speyer et al. |
| 8,171,531 B2 | 5/2012 | Buer |
| 8,249,805 B2 | 8/2012 | de Silva et al. |
| 8,261,093 B1 | 9/2012 | Dhesi et al. |
| 8,307,413 B2 | 11/2012 | Smadja et al. |
| 8,327,428 B2 | 12/2012 | Bailey et al. |
| 8,327,429 B2 | 12/2012 | Speyer et al. |
| 8,340,981 B1 | 12/2012 | Cave |
| 8,346,666 B2 | 1/2013 | Lindelsee et al. |
| 8,380,177 B2 | 2/2013 | Laracey |
| 8,395,242 B2 | 3/2013 | Oliver et al. |
| 8,407,142 B1 | 3/2013 | Griggs |
| 8,423,466 B2 | 4/2013 | Lane |
| 8,426,884 B2 | 4/2013 | Mizutani et al. |
| 8,498,940 B2 | 7/2013 | Pelegero et al. |
| 8,522,039 B2 | 8/2013 | Hyndman et al. |
| 8,572,689 B2 | 10/2013 | Radhakrishnan |
| 8,577,804 B1 | 11/2013 | Bacastow |
| 8,583,498 B2 | 11/2013 | Fried et al. |
| 8,584,251 B2 | 11/2013 | McGuire et al. |
| 8,589,271 B2 | 11/2013 | Evans |
| 8,590,008 B1 | 11/2013 | Ellmore |
| 8,595,812 B2 | 11/2013 | Bomar et al. |
| 8,620,790 B2 | 12/2013 | Priebatsch |
| 8,637,133 B2 | 1/2014 | Vagliardo |
| 8,650,757 B2 | 2/2014 | Rode |
| 8,665,991 B2 | 3/2014 | Zhu et al. |
| 8,682,802 B1 | 3/2014 | Kannanari |
| 8,683,571 B2 | 3/2014 | Zapata et al. |
| 8,732,814 B2 | 5/2014 | Radhakrishnan et al. |
| 8,788,333 B2 | 7/2014 | Alba et al. |
| 8,788,429 B2 | 7/2014 | Ticken |
| 8,789,162 B2 | 7/2014 | Radhakrishnan |
| 8,839,383 B2 | 9/2014 | Van Horn |
| 8,943,574 B2 | 1/2015 | Bailey et al. |
| 8,973,102 B2 | 3/2015 | Jakobsson |
| 8,985,442 B1 | 3/2015 | Zhou et al. |
| 8,996,423 B2 | 3/2015 | Johnson et al. |
| 8,997,215 B2 | 3/2015 | Guriappa Srinivas et al. |
| 9,055,053 B2 | 6/2015 | Radhakrishnan et al. |
| 9,069,943 B2 | 6/2015 | Radhakrishnan et al. |
| 9,131,443 B2 | 9/2015 | Takaki |
| 9,146,345 B1 | 9/2015 | Dong et al. |
| 9,196,188 B2 | 11/2015 | Kimura |
| 9,200,154 B2 | 12/2015 | Teramoto et al. |
| 9,238,674 B2 | 1/2016 | Manoj et al. |
| 9,275,278 B2 | 3/2016 | Liu et al. |
| 9,379,586 B2 | 6/2016 | Rahman et al. |
| 9,400,005 B2 | 7/2016 | Osborn et al. |
| 2002/0157029 A1 | 10/2002 | French et al. |
| 2002/0174073 A1 | 11/2002 | Nordman et al. |
| 2003/0004866 A1 | 1/2003 | Huennekens et al. |
| 2003/0061170 A1 | 3/2003 | Uzo |
| 2003/0105714 A1 | 6/2003 | Alarcon-Luther et al. |
| 2003/0163708 A1 | 8/2003 | Tang |
| 2003/0163787 A1 | 8/2003 | Hay et al. |
| 2005/0119978 A1 | 6/2005 | Ates |
| 2005/0222961 A1 | 10/2005 | Staib et al. |
| 2006/0287004 A1 | 12/2006 | Fuqua |
| 2007/0055594 A1 | 3/2007 | Rivest et al. |
| 2007/0156842 A1 | 7/2007 | Vermeulen et al. |
| 2007/0219984 A1 | 9/2007 | Aravamudan et al. |
| 2008/0109319 A1 | 5/2008 | Foss |
| 2008/0162338 A1 | 7/2008 | Samuels et al. |
| 2008/0162589 A1 | 7/2008 | Rodeheffer et al. |
| 2008/0189210 A1 | 8/2008 | Sawhney |
| 2008/0195499 A1 | 8/2008 | Meredith et al. |
| 2009/0006230 A1 | 1/2009 | Lyda et al. |
| 2009/0057396 A1 | 3/2009 | Barbour et al. |
| 2009/0117883 A1 | 5/2009 | Coffing et al. |
| 2009/0119190 A1 | 5/2009 | Realini |
| 2009/0164327 A1 | 6/2009 | Bishop et al. |
| 2009/0241178 A1 | 9/2009 | Burch et al. |
| 2010/0036741 A1 | 2/2010 | Cleven |
| 2010/0064345 A1 | 3/2010 | Bentley et al. |
| 2010/0122333 A1 | 5/2010 | Noe |
| 2010/0241571 A1 | 9/2010 | McDonald |
| 2010/0268645 A1 | 10/2010 | Martino et al. |
| 2010/0312636 A1 | 12/2010 | Coulter et al. |
| 2011/0004921 A1 | 1/2011 | Homer et al. |
| 2011/0007921 A1 | 1/2011 | Stewart, Jr. et al. |
| 2011/0022483 A1 | 1/2011 | Hammad |
| 2011/0166992 A1 | 7/2011 | Dessert et al. |
| 2011/0218907 A1 | 9/2011 | Dessert et al. |
| 2011/0251892 A1 | 10/2011 | Laracey |
| 2011/0277016 A1 | 11/2011 | Hockings et al. |
| 2011/0294066 A1 | 12/2011 | Hasegawa |
| 2012/0030047 A1 | 2/2012 | Fuentes et al. |
| 2012/0054057 A1 | 3/2012 | O'Connell |
| 2012/0131828 A1 | 5/2012 | August et al. |
| 2012/0158540 A1 | 6/2012 | Ganti et al. |
| 2012/0158586 A1 | 6/2012 | Ganti et al. |
| 2012/0160912 A1 | 6/2012 | Laracey |
| 2012/0166334 A1 | 6/2012 | Kimberg et al. |
| 2012/0171237 A1 | 7/2012 | Ching et al. |
| 2012/0179558 A1 | 7/2012 | Fischer |
| 2012/0197794 A1 | 8/2012 | Grigg et al. |
| 2012/0203700 A1 | 8/2012 | Ornce et al. |
| 2012/0252365 A1 | 10/2012 | Lam |
| 2012/0254941 A1 | 10/2012 | Levien et al. |
| 2012/0271712 A1 | 10/2012 | Katzin et al. |
| 2012/0290482 A1 | 11/2012 | Atef et al. |
| 2012/0316992 A1 | 12/2012 | Oborne |
| 2012/0317034 A1 | 12/2012 | Guha et al. |
| 2012/0323783 A1 | 12/2012 | Canetto |
| 2012/0330846 A1 | 12/2012 | Light et al. |
| 2013/0009547 A1 | 1/2013 | Shiu et al. |
| 2013/0013499 A1 | 1/2013 | Kalgi |
| 2013/0018738 A1 | 1/2013 | Faires et al. |
| 2013/0024360 A1 | 1/2013 | Ballout |
| 2013/0036048 A1 | 2/2013 | Campos et al. |
| 2013/0054336 A1 | 2/2013 | Graylin |

(56) References Cited

U.S. PATENT DOCUMENTS

| | | |
|---|---|---|
| 2013/0054470 A1 | 2/2013 | Campos et al. |
| 2013/0085927 A1 | 4/2013 | Scott |
| 2013/0097683 A1 | 4/2013 | Davis et al. |
| 2013/0110658 A1 | 5/2013 | Lyman et al. |
| 2013/0124346 A1 | 5/2013 | Baldwin et al. |
| 2013/0159178 A1 | 6/2013 | Colon et al. |
| 2013/0166332 A1 | 6/2013 | Hammad |
| 2013/0179341 A1 | 7/2013 | Boudreau |
| 2013/0179954 A1 | 7/2013 | Bidare |
| 2013/0191227 A1 | 7/2013 | Pasa et al. |
| 2013/0204775 A1 | 8/2013 | Midkiff et al. |
| 2013/0204787 A1 | 8/2013 | Dubois |
| 2013/0212019 A1 | 8/2013 | Mattsson et al. |
| 2013/0246258 A1 | 9/2013 | Dessert |
| 2013/0246260 A1 | 9/2013 | Barten et al. |
| 2013/0254052 A1 | 9/2013 | Royyuru et al. |
| 2013/0254115 A1 | 9/2013 | Pasa et al. |
| 2013/0262315 A1 | 10/2013 | Hruska |
| 2013/0268437 A1 | 10/2013 | Desai et al. |
| 2013/0304651 A1 | 11/2013 | Smith |
| 2013/0346302 A1* | 12/2013 | Purves ............... G06Q 20/102 705/40 |
| 2014/0006273 A1 | 1/2014 | Gopinath et al. |
| 2014/0012647 A1 | 1/2014 | Hecht |
| 2014/0025581 A1 | 1/2014 | Calman |
| 2014/0025958 A1 | 1/2014 | Calman |
| 2014/0058938 A1* | 2/2014 | McClung, III ....... G06Q 20/227 705/41 |
| 2014/0096215 A1 | 4/2014 | Hessler |
| 2014/0123244 A1 | 5/2014 | Resch et al. |
| 2014/0130127 A1 | 5/2014 | Toole et al. |
| 2014/0143145 A1 | 5/2014 | Kortina |
| 2014/0143149 A1 | 5/2014 | Aissi |
| 2014/0172707 A1 | 6/2014 | Kuntagod et al. |
| 2014/0188719 A1 | 7/2014 | Poornachandran et al. |
| 2014/0208401 A1 | 7/2014 | Balakrishnan et al. |
| 2014/0214640 A1 | 7/2014 | Mallikarjunan et al. |
| 2014/0244493 A1 | 8/2014 | Kenyon et al. |
| 2014/0244503 A1 | 8/2014 | Sadlier |
| 2014/0245391 A1 | 8/2014 | Adenuga |
| 2014/0245411 A1 | 8/2014 | Meng et al. |
| 2014/0250009 A1 | 9/2014 | Carlson |
| 2014/0279476 A1 | 9/2014 | Hua |
| 2014/0279554 A1 | 9/2014 | Priebatsch et al. |
| 2014/0279566 A1 | 9/2014 | Verma et al. |
| 2014/0310764 A1 | 10/2014 | Tippett et al. |
| 2014/0315159 A1 | 10/2014 | Mukherjee et al. |
| 2014/0324690 A1* | 10/2014 | Allen ................... G06Q 20/36 705/41 |
| 2014/0330721 A1 | 11/2014 | Wang |
| 2014/0337175 A1 | 11/2014 | Katzin et al. |
| 2015/0019317 A1 | 1/2015 | Mitchell |
| 2015/0019439 A1 | 1/2015 | Phillips |
| 2015/0032621 A1 | 1/2015 | Kar et al. |
| 2015/0032627 A1 | 1/2015 | Dill et al. |
| 2015/0039601 A1 | 2/2015 | Harrang et al. |
| 2015/0081557 A1 | 3/2015 | Kinfoil et al. |
| 2015/0081567 A1 | 3/2015 | Boyle et al. |
| 2015/0100495 A1 | 4/2015 | Salama et al. |
| 2015/0120569 A1 | 4/2015 | Belshe et al. |
| 2015/0161610 A1 | 6/2015 | Sahadevan et al. |
| 2015/0170149 A1 | 6/2015 | Sharma et al. |
| 2015/0206131 A1* | 7/2015 | Phillips ............... G06Q 20/34 705/41 |
| 2015/0206137 A1 | 7/2015 | Mazarim Fernandes |
| 2015/0220914 A1 | 8/2015 | Purves et al. |
| 2015/0254648 A1 | 9/2015 | Clements et al. |
| 2015/0254653 A1 | 9/2015 | Bondesen et al. |
| 2015/0254664 A1 | 9/2015 | Bondesen et al. |

OTHER PUBLICATIONS

Simon, "Credit-Card Reward Programs: A Short History"; Creditcards.com, Nov. 2006, 4 pages.

Lane, "History of APIs"; APIEvangelist.com; Dec. 2012, 11 pages.

* cited by examiner

PROVIDING OFFERS ASSOCIATED WITH PAYMENT CREDENTIALS AUTHENTICATED IN A SPECIFIC DIGITAL WALLET

BACKGROUND

In the new technological age, many consumers have converted to the use of digital wallets in alternative to traditional payment methods. Digital wallets provide a means for storing payment credentials associated with consumer accounts that are maintained by financial institutions. In this way, the consumers can access their digital wallets to process electronic commerce transactions as opposed to having a physical payment medium such as a debit card in their possession.

As a result, consumers often interface with their digital wallets when managing payments and processing transactions. However, due to the fact that digital wallets are often maintained by third parties that are not directly associated with the financial institution responsible for issuing the consumer payment credentials, consumers are limited in the types of information related to the account(s) associated with the respective payment credentials that they can see. In order to view account information such as an account balance, a consumer is required to exit the digital wallet and login to a separate application or webpage such as an online banking application. For some individuals, constantly switching back and forth between applications in order to view account information can be quite burdensome.

In this regard, there is a need to reduce a customer's burden by mainstreaming financial account information and financial offers within digital wallets.

BRIEF SUMMARY

Embodiments of the invention are directed to systems, methods, and computer program products for providing supplemental account information in digital wallets. An exemplary apparatus for providing supplemental account information in digital wallets may comprise a memory, a processor, and a module stored in the memory, executable by the processor, and configured to receive a request to provide a digital wallet on a user's mobile device, where the digital wallet is maintained by a digital wallet provider; authenticate at least one payment credential for use within the digital wallet; in response to authenticating the at least one payment credential for use within the digital wallet, receive access to an application programming interface configured to push offers to digital wallets, where the application programming interface is associated with at least one database maintained by the digital wallet provider; receive, via the application programming interface one or more offers from the at least one database, where the offers include at least one incentive for processing payments using the at least one payment credential associated with the digital wallet; and present, to the user on a display of the mobile device, the one or more offers.

In some embodiments, the module may be further configured to download the digital wallet on the user's mobile device such that the digital wallet is maintained, by the digital wallet provider, on the user's mobile device.

In some embodiments, the module may be further configure to receive a request to associate the at least one payment credential with the digital wallet maintained on the user's mobile device, and associate the at least one payment credential with the digital wallet maintained on the user's mobile device.

In some embodiments, the offer comprises a pricing discount for a purchase being made by the user, and where the total price of the purchase including the pricing discount is less than the total price of the purchase if processed using another digital wallet maintained on the user's mobile device.

In some embodiments, the offer comprises a financial incentive for a merchant associated with a purchase being made by the user.

In some embodiments, the module may be further configured to decrease a payment interchange assessment associated with the purchase being made by the user in response to processing a payment using the payment credential associated with the digital wallet.

In some embodiments, the offer comprises providing a reward points incentive for the user.

In some embodiments, the user has a rewards account associated with the digital wallet, and wherein the module may be further configured to credit one or more rewards points to the user's rewards account in response to processing a payment using the payment credential associated with the digital wallet.

In some embodiments, the module may be further configured to the module is further configured to receive information related to other digital wallets maintained on the user's mobile device that are not associated with the digital wallet provider.

In some embodiments, the module may be further configured to the module is further configured to determine based at least partially on the received information the offer for processing payments using the payment credential associated with the digital wallet.

In some embodiments, the received information comprises pricing information related to other digital wallets maintained on the user's mobile device that are not associated with the digital wallet provider.

In some embodiments, the module may be further configured to receive, from the user, an acceptance of the offer for processing payments using the payment credential associated with the digital wallet.

An exemplary method may comprise one or more steps for providing supplemental account information in digital wallets including, but not limited to, receiving a request to provide a digital wallet on a user's mobile device, where the digital wallet is maintained by a digital wallet provider; authenticating at least one payment credential for use within the digital wallet; in response to authenticating the at least one payment credential for use within the digital wallet, receiving access to an application programming interface configured to push offers to digital wallets, where the application programming interface is associated with at least one database maintained by the digital wallet provider; receiving, via the application programming interface one or more offers from the at least one database, where the offers include at least one incentive for processing payments using the at least one payment credential associated with the digital wallet; and presenting, to the user on a display of the mobile device, the one or more offers.

In some embodiments, the method may further comprise downloading the digital wallet on the user's mobile device such that the digital wallet is maintained, by the digital wallet provider, on the user's mobile device.

In some embodiments, the method may further comprise receiving a request to associate the at least one payment credential with the digital wallet maintained on the user's mobile device, and associating the at least one payment credential with the digital wallet maintained on the user's mobile device.

In some embodiments, the offer comprises a pricing discount for a purchase being made by the user, and wherein the total price of the purchase including the pricing discount is less than the total price of the purchase if processed using another digital wallet maintained on the user's mobile device.

An exemplary computer program product for providing supplemental account information in digital wallets may be provided, the computer program product may comprise a non-transitory computer-readable medium comprising a set of codes for causing a computer to receive a request to provide a digital wallet on a user's mobile device, where the digital wallet is maintained by a digital wallet provider; authenticate at least one payment credential for use within the digital wallet; in response to authenticating the at least one payment credential for use within the digital wallet, receive access to an application programming interface configured to push offers to digital wallets, where the application programming interface is associated with at least one database maintained by the digital wallet provider; receive, via the application programming interface one or more offers from the at least one database, where the offers include at least one incentive for processing payments using the at least one payment credential associated with the digital wallet; and present, to the user on a display of the mobile device, the one or more offers.

In some embodiments, the computer program product may further comprise a set of codes for causing a computer to download the digital wallet on the user's mobile device such that the digital wallet is maintained, by the digital wallet provider, on the user's mobile device.

In some embodiments, the computer program product may further comprise a set of codes for causing a computer to receive a request to associate the at least one payment credential with the digital wallet maintained on the user's mobile device, and associate the at least one payment credential with the digital wallet maintained on the user's mobile device.

In some embodiments, the offer comprises a financial incentive for the merchant associated with a purchase being made by the user.

BRIEF DESCRIPTION OF THE DRAWINGS

Figure 1:
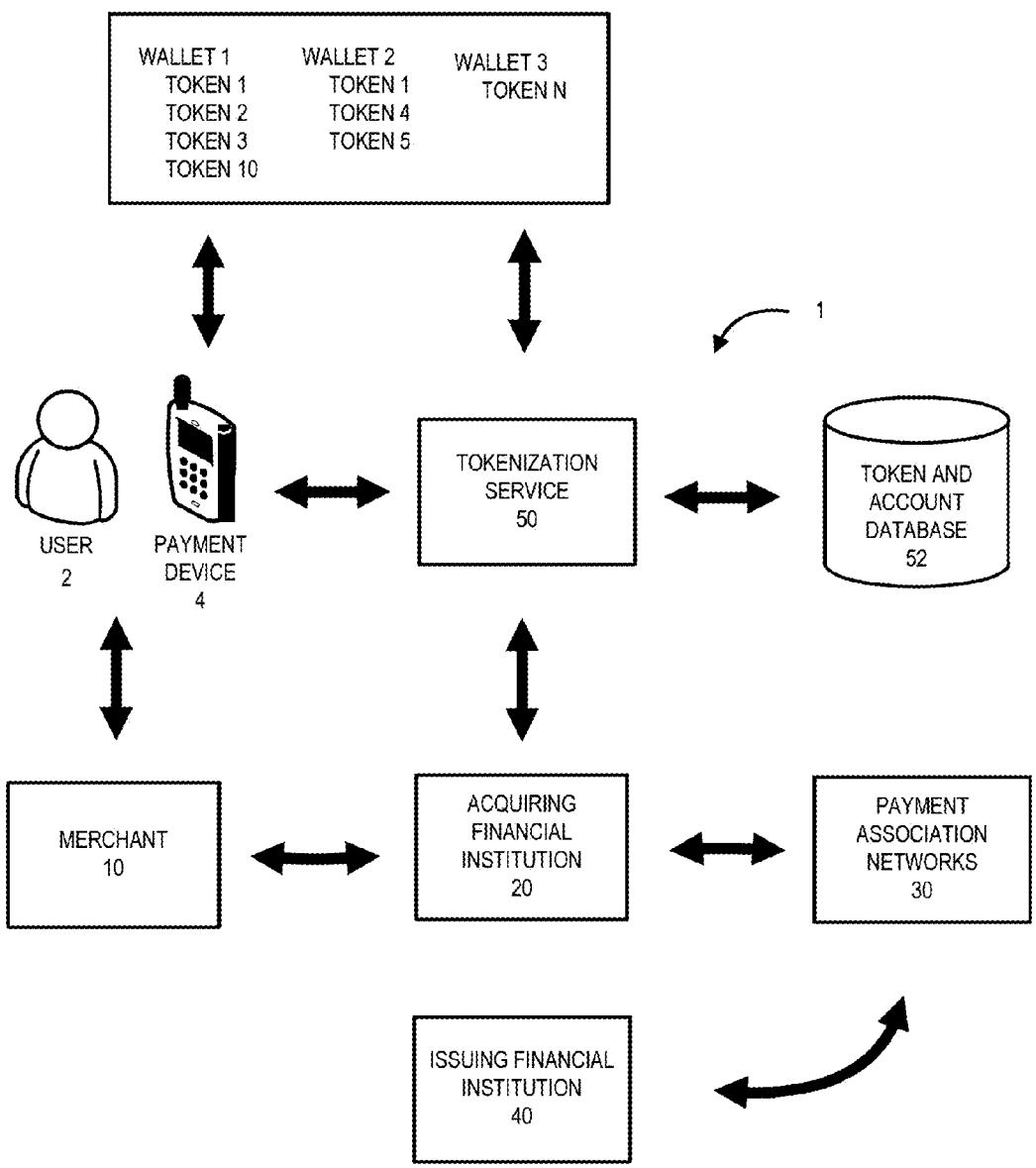
Figure 2:
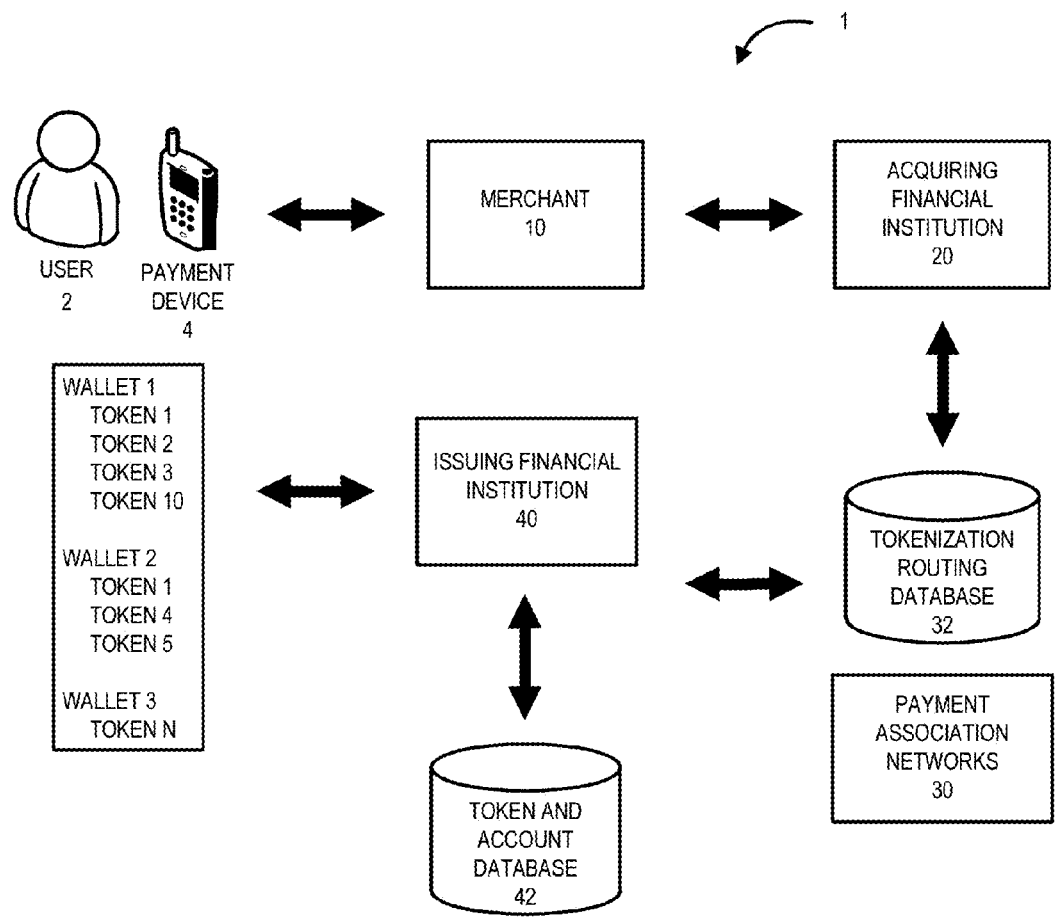
Figure 3:
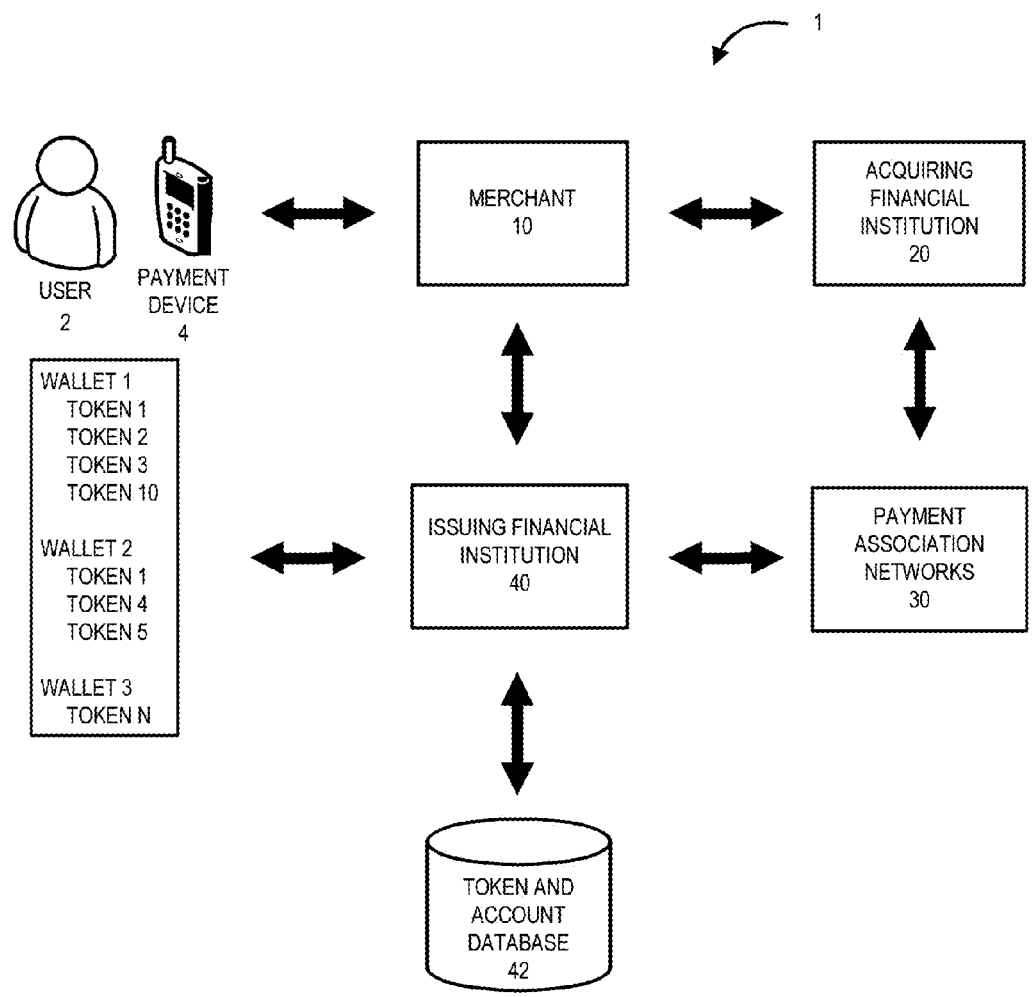
Figure 4:
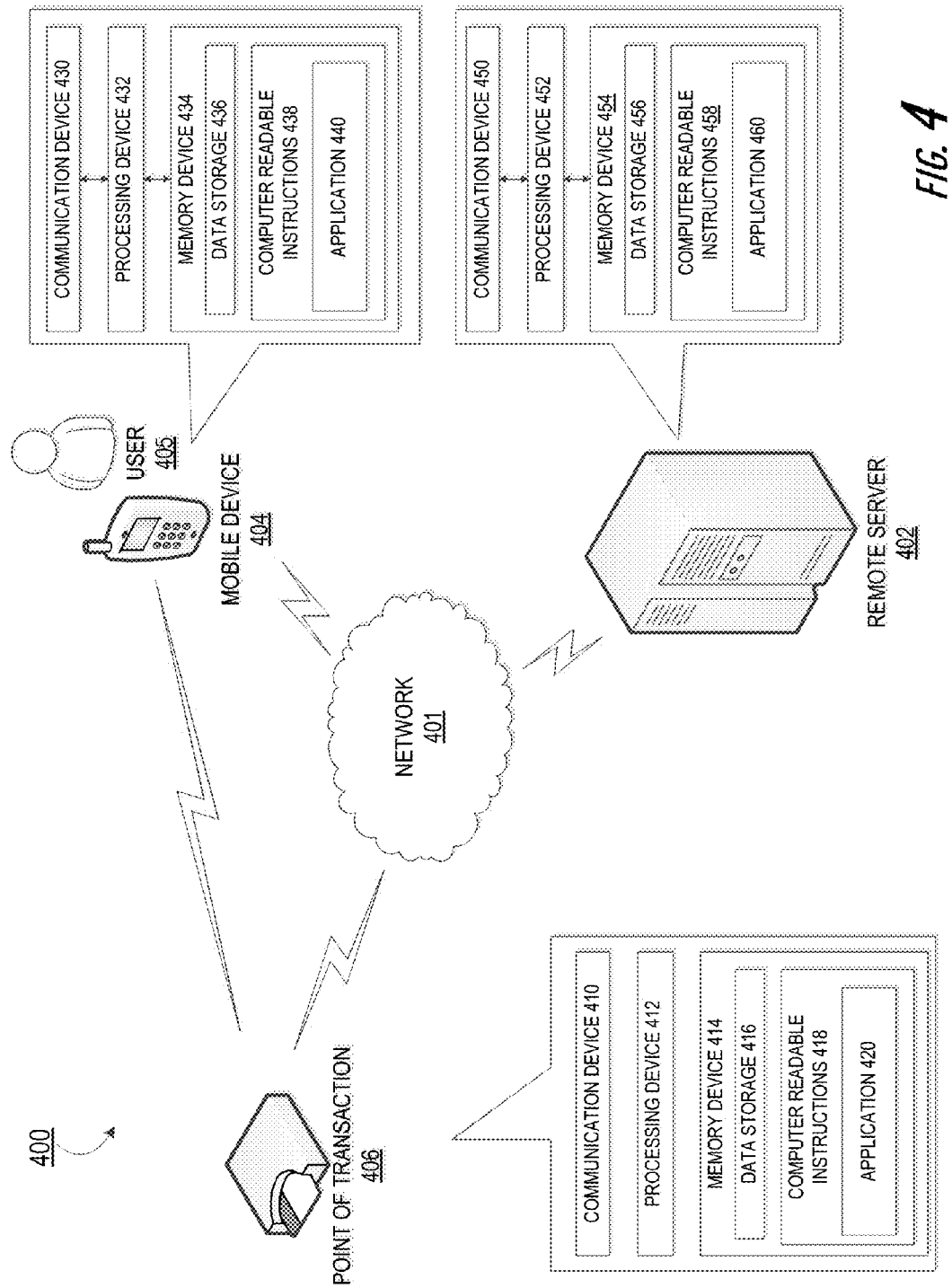
Figure 5:
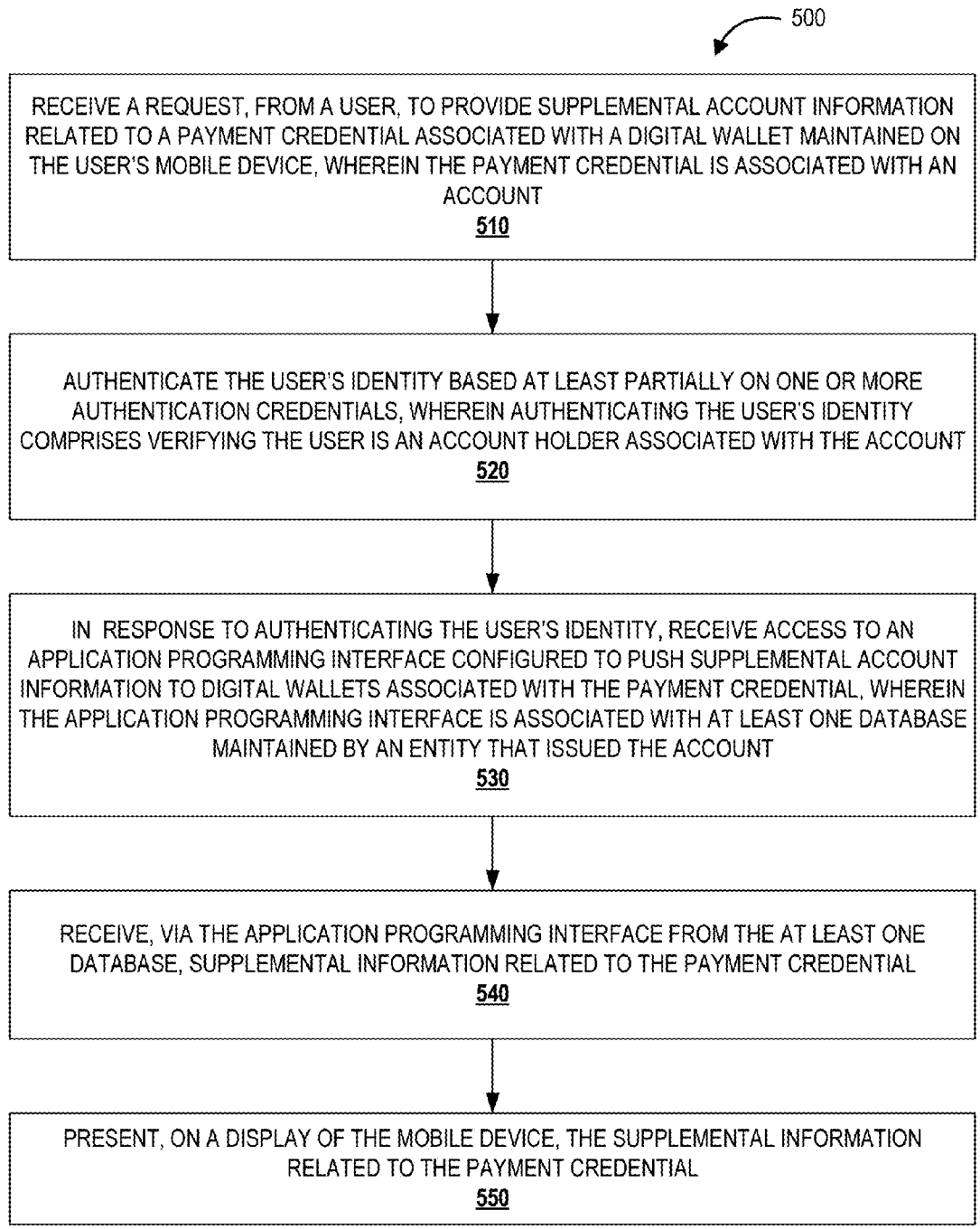
Figure 6:
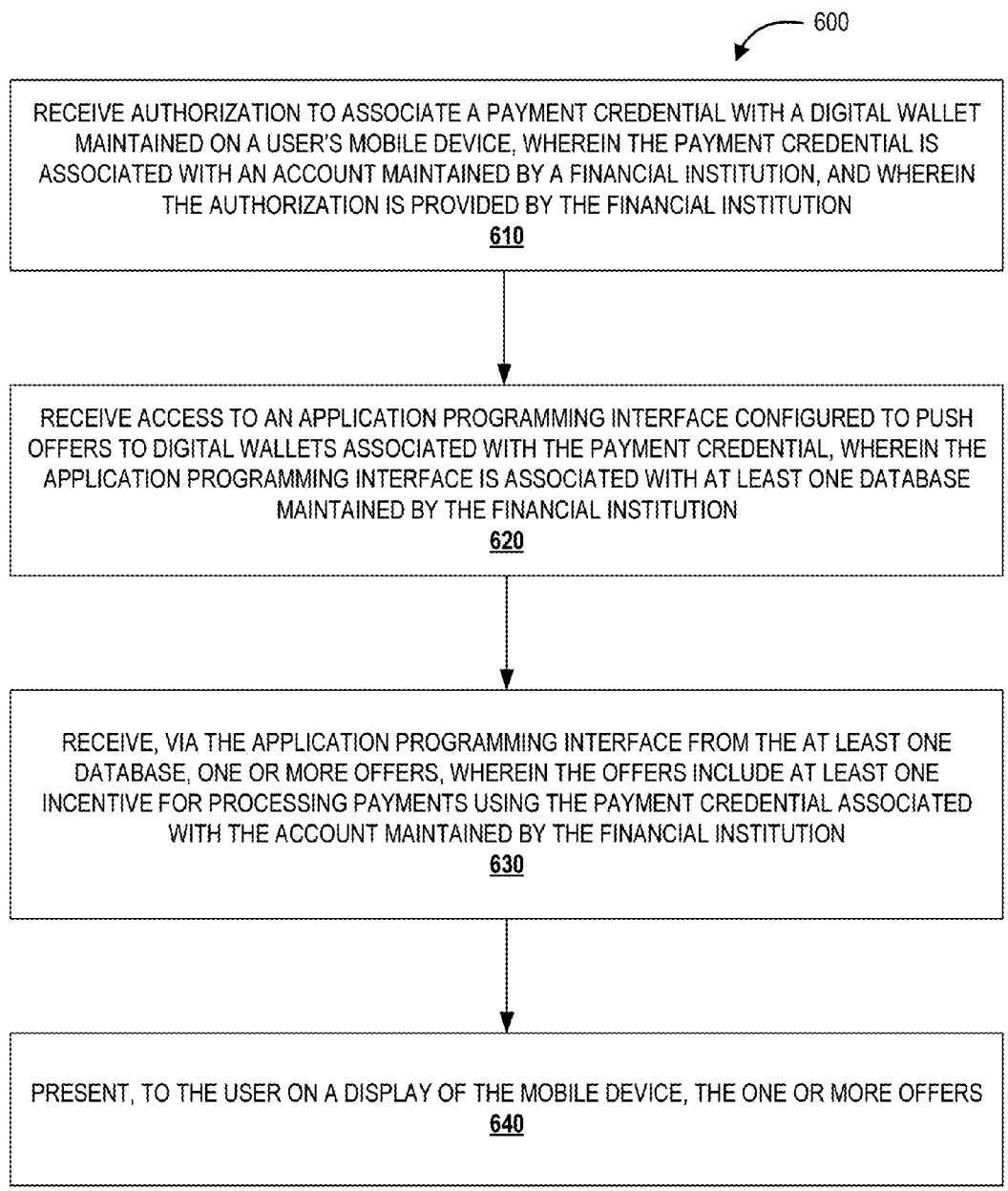
Figure 7:
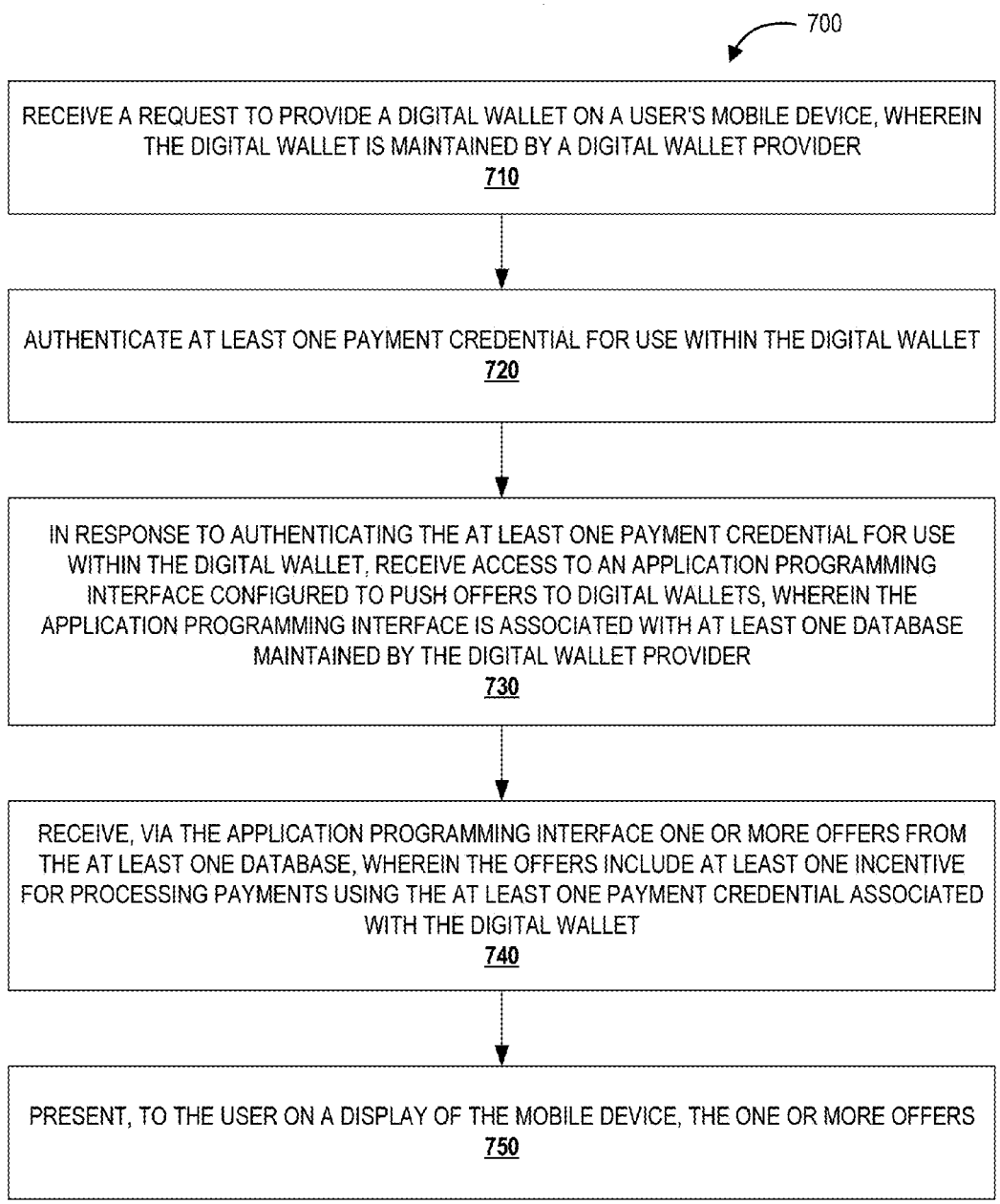

Having thus described embodiments of the invention in general terms, reference will now be made to the accompanying drawings, where:

FIG. 1 is a diagram illustrating a token system, in accordance with embodiments of the present invention;

FIG. 2 is a diagram illustrating a token system, in accordance with embodiments of the present invention;

FIG. 3 is a diagram illustrating a token system, in accordance with embodiments of the present invention;

FIG. 4 is a diagram illustrating an environment in which systems according to embodiments of the invention operate;

FIG. 5 is a flow chart illustrating a general process flow for providing supplemental account information in digital wallets, in accordance with embodiments of the present invention;

FIG. 6 is a flow chart illustrating a general process flow for proving offers associated with payment credentials in digital wallets, in accordance with embodiments of the present invention; and FIG. 7 is a flow chart illustrating a general process flow for proving offers associated with payment credentials authenticated in a specific digital wallet, in accordance with embodiments of the present invention.

DETAILED DESCRIPTION OF EMBODIMENTS OF THE INVENTION

Embodiments of the invention are directed to systems, methods and computer program products for providing supplemental account information related to payment credentials within digital wallets. The invention enables a user to view supplemental account information such as historical transaction data from within a digital wallet that is associated with the user's accounts via a payment credential linked to the account and stored in the digital wallet and/or associated with the digital wallet. Embodiments of the present invention may now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, an "entity" may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a rewards account, a non-monetary user profile that includes only personal information associated with the user, or the like. The account is associated with and/or maintained by the entity. In other embodiments, an entity may not be a financial institution. In still other embodiments, the entity may be the merchant itself.

In some embodiments, the "user" may be a customer (e.g., an account holder or a person who has an account (e.g., banking account, credit account, or the like) at the entity) or potential customer (e.g., a person who has submitted an application for an account, a person who is the target of marketing materials that are distributed by the entity, a person who applies for a loan that not yet been funded).

As used herein, "supplemental account information" may refer to any information that cannot be independently accessed by the digital wallet and/or is not inherently known by the digital wallet. To this extent any information not physically stored within the digital wallet and/or a server associated with the digital wallet, or requiring the use of third party access credentials to contact and access a third party server or database may be defined as supplemental account information.

Aspects of the present invention relate to tokenization, which is generally described in the area of financial transactions as utilizing a "token" (e.g., an alias, substitute, surrogate, or other like identifier) as a replacement for sensitive account information, and in particular account numbers. As such, tokens or portions of tokens may be used as a stand in for a user account number, user name, pin number, routing information related to the financial institution associated with the account, security code, or other like information relating to the user account. The one or more tokens may then be utilized as a payment instrument to complete a transaction. The one or more tokens may be associated with one or more payment devices directly or within one or more digital wallets associated with the payment devices. In other embodiments, the tokens may be associated with electronic transactions that are made over the Internet instead of using a physical payment device. Utilizing a token as a payment instrument instead of actual account information, and specifically an account number, improves security, and provides flexibility and convenience in controlling the transactions, controlling accounts used for the transactions, and sharing transactions between various users.

Tokens may be single-use instruments or multi-use instruments depending on the types of controls (e.g., limits) initiated for the token, and the transactions in which the token is used as a payment instrument. Single-use tokens may be utilized once, and thereafter disappear, are replaced, or are erased, while multi-use tokens may be utilized more than once before they disappear, are replaced, or are erased.

Tokens may be 16-digit numbers (e.g., like credit, debit, or other like account numbers), may be numbers that are less than 16-digits, or may contain a combination of numbers, symbols, letters, or the like, and be more than, less than, or equal to 16-characters. In some embodiments, the tokens may have to be 16-characters or less in order to be compatible with the standard processing systems between merchants, acquiring financial institutions (e.g., merchant financial institution), card association networks (e.g., card processing companies), issuing financial institutions (e.g., user financial institution), or the like, which are used to request authorization, and approve or deny transactions entered into between a merchant (e.g., a specific business or individual user) and a user. In other embodiments of the invention, the tokens may be other types of electronic information (e.g., pictures, codes, or the like) that could be used to enter into a transaction instead of, or in addition to, using a string of characters (e.g., numbered character strings, alphanumeric character strings, symbolic character strings, combinations thereof, or the like).

A user may have one or more digital wallets on the user's payment device. The digital wallets may be associated specifically with the user's financial institution, or in other embodiments may be associated with a specific merchant, group of merchants, or other third parties. The user may associate one or more user accounts (e.g., from the same institution or from multiple institutions) with the one or more digital wallets. In some embodiments, instead of the digital wallet storing the specific account number associated with the user account, the digital wallet may store a token or allow access to a token (e.g., provide a link or information that directs a system to a location of a token), in order to represent the specific account number during a transaction. In other embodiments of the invention, the digital wallet may store some or all of the user account information (e.g., account number, user name, pin number, or the like), including the user account number, but presents the one or more tokens instead of the user account information when entering into a transaction with a merchant. The merchant may be a business, a person that is selling a good or service (hereinafter "product"), or any other institution or individual with which the user is entering into a transaction.

The digital wallet may be utilized in a number of different ways. For example, the digital wallet may be a device digital wallet, a cloud digital wallet, an e-commerce digital wallet, or another type of digital wallet. In the case of a device digital wallet the tokens are actually stored on the payment device. When the device digital wallet is used in a transaction the token stored on the device is used to enter into the transaction with the merchant. With respect to a cloud digital wallet the device does not store the token, but instead the token is stored in the cloud of the provider of the digital wallet (or another third party). When the user enters into a transaction with a merchant, transaction information is collected and provided to the owner of the cloud to determine the token, and thus, how the transaction should be processed. In the case of an e-commerce digital wallet, a transaction is entered into over the Internet and not through a point of sale terminal. As was the case with the cloud digital wallet, when entering into a transaction with the merchant over the Internet the transaction information may be captured and transferred to the wallet provider (e.g., in some embodiments this may be the merchant or another third party that stores the token), and the transaction may be processed accordingly.

Specific tokens, in some embodiments, may be tied to a single user account, but in other embodiments, may be tied to multiple user accounts, as will be described throughout this application. In some embodiments a single tokens could represent multiple accounts, such that when entering into a transaction the user may select the token (or digital wallet associated with the token) and select one of the one or more accounts associated with the token in order to allocate the transaction to a specific account. In still other embodiments, after selection of the token by the user the system may determine the best account associated with the token to use during the transaction (e.g., most cash back, most rewards points, best discount, or the like). In addition, the tokens may be associated with a specific digital wallet or multiple digital wallets as desired by the institutions or users.

Moreover, the tokens themselves, or the user accounts, individual users, digital wallets, or the like associated with the tokens, may have limitations that limit the transactions that the users may enter into using the tokens. The limitations may include, limiting the transactions of the user to a single merchant, a group of multiple merchants, merchant categories, single products, a group a products, product categories, transaction amounts, transaction numbers, geographic locations, or other like limits as is described herein.

FIGS. 1 through 3 illustrate a number of different ways that the user 2 may use one or more tokens in order to enter into a transaction, as well as how the parties associated with the transaction may process the transaction. FIG. 1, illustrates one embodiment of a token system process 1, wherein the token system process 1 is used in association with a tokenization service 50. The tokenization service 50 may be provided by a third-party institution, the user's financial institution, or another institution involved in a transaction payment process. As illustrated in FIG. 1 (as well as in FIGS. 2 and 3), a user 2 may utilize a payment device 4 (or in other embodiments a payment instrument over the Internet) to enter into a transaction. FIG. 1 illustrates the payment device 4 as a mobile device, such as a smartphone, personal digital assistant, or other like mobile payment device. Other types of payment devices 4 may be used to make payments, such as but not limited to an electronic payment card, key fob, a wearable payment device (e.g., watch, glasses, or the like), or other like payment devices 4. As such, when using a payment device 4 the transaction may be made between the point of sale (POS) and the payment device 4 by scanning information from the payment device 4, using near field communication (NFC) between the POS and the payment device 4, using wireless communication between the POS and the payment device 4, or using another other type of communication between the POS and the payment device 4. When entering into an e-commerce transaction over the Internet, for example using the payment device 4 or another device without a POS, a payment instrument (e.g., a payment application that stores the token) may be used to enter into the transaction. The payment instrument may be the same as the token or digital wallet associated with the payment device 4, except they are not associated with specific payment device. For example, the token or digital wallet may be associated with a payment application that can be used regardless the device being used to enter into the transaction over the Internet.

The token can be associated directly with the payment device 4, or otherwise, through one or more digital wallets associated with the payment device 4. For example, the token may be stored on one or more payment devices 4 directly, and as such any transaction entered into by the user 2 with the one or more payment devices 4 may utilize the token. Alternatively, the payment device 4 may have one or more digital wallets stored on the payment device 4 that allow the user 2 to store one or more user account numbers, or tokens associated with the user account numbers, on the one or more digital wallets. The user may select a digital wallet or account within the digital wallet in order to enter into a transaction using a specific type of customer account. As such, the digital wallets may be associated with the user's issuing financial institutions 40, other financial institutions, merchants 10 with which the user enters into transactions, or a third party institutions that facilitates transactions between users 2 and merchants 10.

As illustrated in FIG. 1, a tokenization service 50 may be available for the user 2 to use during transactions. As such, before entering into a transaction, the user 2 may generate (e.g., create, request, or the like) a token in order to make a payment using the tokenization service 50, and in response the tokenization service 50 provides a token to the user and stores an association between the token and the user account number in a secure token and account database 52. The token may be stored in the user's payment device 4 (e.g., on the digital wallet) or stored on the cloud or other service through the tokenization service 50. The tokenization service 50 may also store limits (e.g., geographic limits, transaction amount limits, merchant limits, product limits, any other limit described herein, or the like) associated with the token that may limit the transactions in which the user 2 may enter. The limits may be placed on the token by the user 2, or another entity (e.g., client, administrator, person, company, or the like) responsible for the transactions entered into by the user 2 using the account associated with the token. The generation of the token may occur at the time of the transaction or well in advance of the transaction, as a one-time use token or multi-use token.

After or during creation of the token the user 2 enters into a transaction with a merchant 10 using the payment device 4 (or payment instrument over the Internet). In some embodiments the user 2 may use the payment device 4 by itself, or specifically select a digital wallet or user account stored within the digital wallet, to use in order to enter into the transaction. The token associated with payment device, digital wallet, or user account within the wallet is presented to the merchant 10 as payment in lieu of the actual user account number and/or other user account information. The merchant 10 receives the token, multiple tokens, and/or additional user account information for the transaction. The merchant 10 may or may not know that the token being presented for the transaction is a substitute for a user account number or other user account information. The merchant also captures transaction information (e.g., merchant, merchant location, transaction amount, product, or the like) related to the transaction in which the user 2 is entering with the merchant 10.

The merchant 10 submits the token (as well as any user account information not substituted by a token) and the transaction information for authorization along the normal processing channels (also described as processing rails), which are normally used to process a transaction made by the user 2 using a user account number. In one embodiment of the invention the acquiring financial institution 20, or any other institution used to process transactions from the merchant 10, receives the token, user account information, and transaction information from the merchant 10. The acquiring financial institution 20 identifies the token as being associated with a particular tokenization service 50 through the token itself or user account information associated with the token. For example, the identification of the tokenization service 50 may be made through a sub-set of characters associated with the token, a routing number associated with the token, other information associated with the token (e.g., tokenization service name), or the like. The acquiring financial institution 20 may communicate with the tokenization service 50 in order to determine the user account number associated with the token. The tokenization service 50 may receive the token and transaction data from the acquiring financial institution 20, and in response, provide the acquiring financial institution 20 the user account number associated with the token as well as other user information that may be needed to complete the transaction (e.g., user name, issuing financial institution routing number, user account number security codes, pin number, or the like). In other embodiments, if limits have been placed on the token, the tokenization service 50 may determine whether or not the transaction information meets the limits and either allows or denies the transaction (e.g., provides the user account number or fails to provide the user account number). The embodiment being described occurs when the token is actually stored on the payment device 4. In other embodiments, for example, when the actual token is stored in a cloud the payment device 4 may only store a link to the token or other token information that allows the merchant 10 or acquiring financial institution to acquire the token from a stored cloud location.

If the acquiring financial institution 20 receives the user account number from the tokenization service 50 (e.g., the tokenization service indicates that the transaction meets the limits), then the acquiring financial institution 20 thereafter sends the user account number, the other user information, and the transaction information directly to the issuing financial institution 40, or otherwise indirectly through the card association networks 30. The issuing financial institution 40 determines if the user 2 has the funds available to enter into the transaction, and if the transaction meets other limits on the user account, and responds with approval or denial of the transaction. The approval runs back through the processing channels until the acquiring financial institution 20 provides approval or denial of the transaction to the merchant 10 and the transaction between the merchant 10 and the user 2 is completed. After the transaction is completed the token may be deleted, erased, or the like if it is a single-use token, or stored for further use if it is a multi-use token.

Instead of the process described above, in which the acquiring financial institution 20 requests the token from the tokenization service 50, in some embodiments the tokenization service 50 may receive the transaction request and transaction information from the merchant 10 or acquiring financial institution 20. Instead of providing the account number to the acquiring financial institution 20, the tokenization service 50 may send the transaction request and transaction information to the issuing financial institution 40 directly, or indirectly through the payment association networks 30.

The embodiment illustrated in FIG. 1 prevents the user account number and other user information from being presented to the merchant 10; however, the tokenization service 50, acquiring financial institution 20, the card association networks 30, and the issuing financial institution 40 may all utilize the actual user account number and other user information to complete the transaction.

FIG. 2 illustrates another embodiment of a token system process 1, in which the user 2 may utilize a payment device 4 (or payment instrument over the Internet) to enter into transactions with merchants 10 utilizing tokens instead of user account numbers. As illustrated in FIG. 2, the user may have one or more tokens, which may be associated with the payment device 4, one or more digital wallets within the payment device 4, or one or more user accounts associated with the digital wallets. The one or more tokens may be stored in the user's payment device 4 (or on the digital wallet), or stored on a cloud or other service through the issuing financial institution 40 or another institution. The user 2 may set up the digital wallet by communicating with the issuing financial institution 40 (e.g., the user's financial institution) to request a token for the payment device, either for the device itself, or for one or more digital wallets or one or more user accounts stored on the payment device. As previously discussed, a wallet may be specifically associated with a particular merchant (e.g., received from the merchant 10) and include one or more tokens provided by the issuing financial institution 40 directly (or through the merchant as described with respect to FIG. 3). In other embodiments, the issuing financial institution 40 may create the digital wallet for the user 2 (e.g., through a wallet created for a business client or retail client associated with the user 2) and include one or more tokens for various types of transactions, products, or the like. The issuing financial institution 40 may store the tokens, the associated user account information (e.g., including the user account number), and any limits on the use of the tokens, as was previously described with respect to the tokenization service 50 in FIG. 1. In one embodiment the tokens may include user account information or routing information within the token or tied to the token, which allows the merchants 10 and other institutions in the payment processing systems to route the token and the transaction information to the proper institutions for processing. In other embodiments a tokenization routing database 32 may be utilized to determine where to route a transaction using a token, as described in further detail later.

The user 2 may enter into a transaction with the merchant 10 using a payment device 4 (or a payment instrument through the Internet). In one embodiment the user 2 may enter into the transaction with a token associated with the payment device 4 itself (or a payment instrument through the Internet). In other embodiments, a specific digital wallet and/or a specific account within the digital wallet may be selected for a particular merchant with whom the user 2 wants to enter into a transaction. For example, the user 2 may select "wallet 1" to enter into a transaction with "merchant 1" and "token 1" to utilize a specific account. The merchant 10 identifies the token, and sends the token and the transaction information to the acquiring financial institution 20. If the token has routing information the acquiring financial institution 20 may route the token and transaction data to the issuing financial institution 40 directly or through the card association networks 30. In situations where the token does not have associated routing information, the acquiring financial institution 20 may utilize a tokenization routing database 32 that stores tokens or groups of tokens and indicates to which issuing financial institutions 40 the tokens should be routed. One or more of the acquiring financial institutions 20, the card association networks 30, and/or the issuing financial institutions 40 may control the tokenization routing database in order to assign and manage routing instructions for tokenization across the payment processing industry. The tokenization routing database 32 may be populated with the tokens and the corresponding issuing financial institutions 40 to which transactions associated with the tokens should be routed. However, in some embodiments no customer account information would be stored in this tokenization routing database 32, only the instructions for routing particular tokens may be stored.

Once the token and transaction details are routed to the issuing financial institution 40, the issuing financial institution 20 determines the user account associated with the token through the use of the token account database 42. The financial institution determines if the funds are available in the user account for the transaction and if the transaction information meets other limits by comparing the transaction information with the limits associated with the token, the user account associated with the token, or other limits described herein. If the transaction meets the limits associated with the token or user account, then the issuing financial institution 20 allows the transaction. If the transaction information does not meet one or more of the limits, then the issuing financial institution 20 denies the transaction. The issuing financial institution sends a notification of the approval or denial of the transaction back along the channels of the transaction processing system to the merchant 10, which either allows or denies the transaction.

The embodiment illustrated in FIG. 2 allows the user and the financial institution to shield the user's account number and other user information from all of the entities in the payment processing system because the merchant 10, acquiring merchant bank 20, payment association networks 30, or other institutions in the payment processing system only use the token and/or other shielded user information to process the transaction. Only the issuing financial institution 40 has the actual account number of the user 2.

FIG. 3 illustrates another embodiment of the token system process 1, in which the user 2 may utilize a payment device 4 (or payment instrument over the Internet) to enter into transactions with a merchant 10 utilizing a token instead of a user account number and/or other user account information. As illustrated in FIG. 3, the user 2 may have one or more tokens associated with the payment device 2, the one or more digital wallets, or one or more user accounts within the digital wallets. The one or more tokens may be stored in the user's payment device 4 (or within the digital wallet), or stored on a cloud or other service through the issuing financial institution 40 or another institution. The user 2 may set up the digital wallet by communicating with the issuing financial institution 40 (e.g., the user's financial institution) and/or the merchant 10 to request a token for the payment device 4, either for the payment device 4 itself, for the one or more digital wallets stored on the payment device 4, or for user accounts within the digital wallet. The financial institution 40 may have a dedicated group of tokens that are associated with a specific merchant, and as such the merchant 10 and the issuing financial institution 40 may communicate with each other to provide one or more tokens to the user 2 that may be specifically associated with the merchant 10. For example, the issuing financial institution may provide a set of tokens to "merchant 1" to associate with "wallet 1" that may be used by one or more users 2. As such "Token 10" may be associated with "wallet 1" and be specified only for use for transactions with "merchant 1."

The merchant 10 may provide the specific tokens from the financial institution 40 to the user 2, while the financial institution 40 may store the user account information with the token provided to the user 2. The financial institution may communicate directly with the user 2, or through the merchant 10 in some embodiments, in order to associate the token with the user 2. Since the merchant 10 provides, or is at least notified by the financial institution 40, that a specific token, or groups of tokens, are associated with a specific issuing financial institution 40, then the merchant 10 may associate routing information and transaction information with the token when the user 2 enters into a transaction with the merchant 10 using the token.

The merchant 10 passes the token (and potentially other user account information), routing information, and transaction information to the acquiring financial institution 20 using the traditional payment processing channels. The acquiring financial institution 20, in turn, passes the token (and potentially other user account information) and transaction information to the issuing financial institution 40 directly, or indirectly through the payment association networks 30 using the routing information. The issuing financial institution 40 accesses the token and account database 42 to identify the user account associated with the token and determines if the transaction information violates any limits associated with the token or the user account. The issuing financial institution 40 then either approves or denies the transaction and sends the approval or denial notification back through the payment processing system channels to the merchant 10, which then notifies the user 2 that the transaction is allowed or denied.

As is the case with the token system process 1 in FIG. 2, the token system process 1 in FIG. 3 allows the user 2 and the financial institution 40 to shield the user's account number and other user information from all of the entities in the payment processing system because the merchant 10, acquiring merchant bank 20, payment association networks 30, or other institutions in the payment processing system only use the token and/or other shielded user information to process the transaction. Only the issuing financial institution 40 has the actual account number of the user 2.

The embodiments of the invention illustrated in FIGS. 1 through 3 are only example embodiments of the invention, and as such it should be understood that combinations of these embodiments, or other embodiments not specifically described herein may be utilized in order to process transactions between a user 2 and merchant 10 using one or more tokens as a substitute for user account numbers or other user account information, such that the merchant 10, or other institutions in the payment processing system do not have access to the actual user accounts or account information.

As briefly discussed above, if the issuing financial institution 40 creates the digital wallet not only does the issuing financial institution 40 receive transaction information along the normal processing channels, but the financial institution 50 may also receive additional transaction information from the user 2 through the digital wallet using the application program interfaces (APIs) or other applications created for the digital wallet. For example, geographic location information of the user 2, dates and times, product information, merchant information, or any other information may be transmitted to the issuing financial institution 40 through the APIs or other applications to the extent that this information is not already provided through the normal transaction processing channels. This additional transaction information may assist in determining if the transactions meet or violate limits associated with the tokens, user accounts, digital wallets, or the like.

Alternatively, if the merchant 10 or another institution, other than the issuing financial institution 40, provides the digital wallet to the user 2, the issuing financial institution 40 may not receive all the transaction information from the traditional transaction processing channels or from the digital wallet. As such, the issuing financial institution 40 may have to receive additional transaction information from another application associated with the user 2 and compare the transaction information received through the traditional channels in order to associate the additional information with the transaction. In other embodiments, the issuing financial institutions 40 may have partnerships with the merchants 10 or other institutions to receive additional transaction information from the digital wallets provided by the merchants or other institutions when the users 2 enter into transactions using the digital wallets.

Moreover, when there is communication between the digital wallets of the users 2 and the issuing financial institution 40 or another institution, transactions in which the user 2 may enter may be pre-authorized (e.g., pre-qualified) to determine what accounts (e.g., tokens) may be used to complete the transaction, without having to arbitrarily choose an account for the transaction. In the case when there are multiple digital wallets or multiple accounts, the account that is pre-authorized or the account that provides the best rewards may be automatically chosen to complete the transactions.

Additional embodiments of the invention will now be described in further detail in order to provide additional concepts and examples related to how tokens may be utilized in these illustrated token system processes 1 or in other token system processes not specifically described in FIGS. 1 through 3.

In some embodiments, a shared token is created or requested for the collaboration of the users 2. An institution (e.g., issuing financial institution, third party institution, or the like) may create the token for a business client or retail client. In one embodiment, the business client or retail client may request the token from the institution. For example, in one embodiment the business client may request a token for a collaborative group of employee users 2 for use with one or more customers of the business client during one or more business trips, for one or more projects, for one or more transactions, or the like. With respect to the retail client, the retail client may request a token for a collaborative group of retail users 2 (e.g., group of family members, group of friends on a trip, or the like) for one or more trips, for use on one or more projects, for one or more transactions, or the like. In other embodiments of the invention, the business client or retail client may create the token and notify the institution storing the account information of the token created. As such, the institution may store the relationship between the token and the account information to allow use of the token in transactions.

In some embodiments, the requesting business client or retail client may appoint an administrator to oversee the use of the shared token. For example, in the case of a business client, the business client may associate one or more administrators (e.g., employees) with the token to set and control the spending of a collaborative group of employee users 2 that are granted access to use the token. In the case of a retail client, the retail client may associate one or more administrators (e.g., parents, trustee, legal guardian, or user 2 that creates or is a part of a group of users 2, or the like) with the token to set and control the spending of the collaborative group of retail users 2 (e.g., kids, grandparents, any other dependents, group of users 2, or the like) that are granted access to use the token. The administrators may be responsible for creating, adding, or removing users 2 from the collaborative group of users 2, setting limits on the transactions in which the users 2 may enter, or the like. In some embodiments there may be more than one administrator for a shared token used by a collaborative group of users 2. Moreover, the administrators may also be users 2 within the collaborative group of users 2.

In some embodiments, the shared token is associated with an account. As previously discussed, a shared token may be associated with an account by the issuing financial institution 40 or a third party (e.g., tokenization service 50) independent of the issuing financial institution 40, for a business client or a retail client. For example, in the case of a business client, the token may be associated with a business account (e.g., a corporate card) that a collaborative group of employee users 2 may utilize in order to enter into transactions related to the business. In other embodiments of the invention, in the case of a retail client, the token may be associated with an account of the administrator (e.g., parents may associate the tokens with one or more accounts owned by the parents) and/or an account of another user 2 within the collaborative group of users 2. In some embodiments, the token may be associated with multiple accounts that may be debited or charged equally, or charged based on assigned limits, when a transaction is entered into by one or more of the collaborative group of users 2. However, in some embodiments of the invention the account associated with a token may be a new account that is created just for the collaborative group of users 2 and is funded by the collaborative group of users 6, as is discussed in further detail below.

In some embodiments, one or more users are associated with the shared token, or the account associated with the shared token. For example, the user 2 (e.g., employee users, retail users, or the like) may be authorized as users 2 of the token (e.g., by the administrator) or otherwise associated with the account with which the shared token is associated. For example, in some embodiments user information may be associated with the shared token or the account, such as a user name, user identification number, payment device 4 identifier, digital wallet identifier, or the like. In other embodiments the administrators (e.g., of the business client or retail client) may determine what users 2 may download, access, or otherwise utilize the shared token to enter into transactions, by adding the user information to a list that allows the users 2 to gain access to the shared token. In other embodiments of the invention, the business client or retail client may utilize a messaging system (e.g., e-mail, text message, online banking account message, social media message, or other like message over another communication channel) to send a notification message to the one or more users 2 indicating that the users 2 may join a collaborative group of users 2. In still other embodiments, the users 2 may send a request to join a collaborative group of users 2 to the issuing financial institution 40. As such, in some embodiments the users 2 may be manually or automatically added to the collaborative group of users 2 before being asked to join a collaborative group of users 2, or provided with the shared token or access to the shared token. In other embodiments the users 2 may be added only after the users 2 are sent a message to join a collaborative group of users 2, and acceptance of the invitation to join is received from the user 2.

In some embodiments, the shared tokens or access to the shared tokens may be distributed to the plurality of users 2. In some embodiments of the invention, the business client or retail client may again utilize a messaging system to send a notification message to the one or more users 2 illustrating how to join a collaborative group of users 2, and be allowed to use the shared token for transactions. As previously discussed, the collaborative group of users 2 may be formed to jointly utilize a shared token for transactions related to one or more customers, one or more specific transactions, one or more projects, one or more trips (e.g., business trips, vacations, or the like). The message or another like communication may securely provide the shared token to the users 2, or in the alternative may provide the users 2 the necessary token information to access the shared tokens when entering into transactions. As such, the users 2 may download, access, or otherwise identify the shared token. The actual shared tokens or the shared token information used to access the tokens may be stored within the users' payment devices 4, or stored in an application that may be accessed by the users' payment devices 4.

In some embodiments, the shared token, or otherwise the shared token information that identifies where to access the shared token to enter into a transaction, may be stored in the payment device 4. For example, in some embodiments the payment device 4 or a digital wallet within the payment device 4 may store the token information (e.g., store the actual token numbers, store a link to the token numbers, or otherwise communicate with a system that stores the token information, such as a cloud system) instead of the actual account number or other account information with which the token is associated. In other embodiments, the shared token or shared token information may be stored in an application that can be used for in-person transactions at a POS or for e-commerce transactions. In still other embodiments of the invention, the shared token or shared token information may be stored on multiple payment devices (e.g., personal mobile device, business mobile device, electronic credit card, or any other like device discussed or not discussed herein) of a single user 2. As such, the user 2 may enter into transactions using the same shared token over various payment devices 4.

In some embodiments, the account associated with the shared token is funded. In some embodiments of the invention, the account may be a credit account, a debit account, or another like account. Furthermore, the shared token may be associated with an account that is already funded, such as a corporate account or family account that already has associated funds. As such, additional funds may be made available or added to the account, if needed. In other embodiments, the account may be a new account, and as such the account may need to be funded in order to enter into transactions using the shared token. As such, in one embodiment the account may be a credit account, and funding the account indicates placing a spending account limit on the account. The amount of funds available may also be based on collateral associated with the account by the users 2. Each user may be responsible for a portion of the maximum spending limit of the account, or in other embodiments may be responsible for the entire spending limit jointly and severably. In other embodiments of the invention the account may be a debit account, and funding the account indicates debiting funds from the one or more users 2 (or other funding sources) into the account. Each user associated with the account may provide the same amount to the account (e.g., $500 each), or each user may provide different amounts. The amount of funds contributed to the account (e.g., debit account), or attributed to the account (e.g., credit account), by each user 2 may be tracked in order to determine how much the users 2 may spend, or how much should be returned to the users 2 after they leave the collaborative group of users 2. In some embodiments one or more users 2 may contribute funds on a recurring basis. In still other embodiments, if one or more users 2 enter into transactions without using the shared token (e.g., use other user accounts) the one or more users 2 may be reimbursed using funds from the account associated with the shared token.

In some embodiments, one or more limits are placed on the shared token. As such, the limits may be applied to any shared token regardless of how many users 4 or payment devices 4 are associated with the shared token (e.g., tokens associated with different users 2 or tokens associated with multiple payment devices 4 associated with the same users 2). Alternatively, or in addition to the shared token limits, one or more limits are placed on the users 2 (e.g., individual users, groups of users, or the like) within the collaborative group of users 2. As such, the limits may be applied to the users 2 regardless of the one or more shared tokens associated with the users 2 or the payment devices 4 used by the users 4. In other embodiments of the invention the limits may be placed on the payment devices 4 or digital wallets within the payment devices 4. Examples of the limits may include the maximum aggregate amount spent using the account, the maximum single transaction amount, geographic limits (e.g., specific merchant, area, zip code, city, county, state, country, radius from a specified point, route along one or more roads, or other like geographic location), merchant limits, product limits, or the like. Additional limits may include time period limits, such as hourly, time of day, daily, weekly, monthly, or custom timeframes (e.g., every other day, every Saturday, or the like). All the different types of limits may be approval limits or denial limits, such that for example the limits may include allowing transactions in a specific geographic area and/or for a particular time, or denying transactions in a specific geographic area and/or for a particular time. In other embodiments of the invention the client, or administrators associated with the client, may have the ability to lock, unlock, suspend, or the like the use of the shared token or digital wallet. When the limits are placed on the shared token, if the token becomes misappropriated and replaced with another shared token, the limits may be lost or have to be transferred to the new replacement shared token. As such, in some embodiments when a token is replaced the limits are transferred to the new token, while in other embodiments the limits may have to be reinstituted. In other embodiments, the limits may be associated with the individual users 2, groups of users 2, or the like, which allows the different limits to be placed on the users 2 globally, on multiple users 2, or on individual users 2, as desired by the client. Moreover, in one embodiment a user 2 may have a first shared token associated with a first collaborative group of users 2, and a second shared token associated with a second collaborative group of users 2. In some embodiments, limits may be placed globally on the use of both tokens, on the tokens themselves, groups of users 2 within the tokens, or on the individual users 2. It should be understood that any combination of limits described herein may be used to set various limits.

In some embodiments, an institution receives an indication that a shared token is being used in a transaction. The institution also receives transaction information associated with the transaction. The institution that receives the indication of the transaction, and/or the transaction information, was previously described with respect to FIGS. 1-3. As such, the institution may be the issuing financial institution 40, the tokenization service 50 institution, and/or the client that sets the limits. In the embodiment in which the client sets and/or stores the limits, the issuing financial institution 40 or the tokenization service 50 institution (e.g., through the digital wallet or another application) may communicate with the client to determine, or otherwise access, the limits stored at the client, and determine if the transaction should be allowed or denied before allowing or denying the transaction. In other embodiments, the merchant 10 (e.g., through the digital wallet or another application) may communicate with the client to determine, or otherwise access, the limits stored at the client before passing the transaction on for processing or before allowing or denying the transaction.

As such, as previously discussed with respect to FIGS. 1 through 3, a determination is made as to if the transaction associated with the shared token being used meets the limits. In one embodiment the highest levels of limits (e.g., global limits) may be asserted first, then the next levels of limits (e.g., group limits, sub-group limits) may be asserted next, then the individual level of limits (e.g., individual user, token, accounts in the digital wallets, or the like limits) may be asserted in order to determine if the transaction should be allowed or denied. In other embodiments of the invention, the inverse may occur, and as such, the individual limits (e.g., user limits, token limits, or the like) may be asserted first, then the sub-group or group limits, and finally the global limits. In other embodiments of the invention, the limits may be asserted in any order.

If the transaction (e.g., transaction information) fails to meet the limits, the transaction may be denied. Alternatively, if the transaction (e.g., transaction information) meets the limits then transaction may be allowed.

While the system has been described as determining whether the transaction meets the limits and either allowing or denying a transaction based on that determination, in some embodiments the filters may also be responsive to transaction information. For example, exceptions to the filters may allow a transaction even if the filter is not met. In an embodiment, the system evaluates the transaction information to determine: (1) does the transaction meet the limits; and (2) if the transaction does not meet the limits, does the transaction qualify for an exception to the limits. If the system determines that a positive response to either query, then transaction may be allowed.

In some embodiments, the exceptions are based at least in part upon the transaction information. For example, the system may determine that a transaction does not meet a category limit because doing so would cause the token to exceed the category limit for the time period. In this example, however, the system also determines that the token is near, e.g., within one week, within three days, within one day, or the like, the expiration date of the token or the current evaluation period for the token and that the token has remaining funds in a different category. Given the short period of time remaining for the expenses to be made, the system may determine that the transaction falls within an exception and allow the transaction. In another example, the system may determine that the user is outside of geographic limits defined by a route. The system, however, determines that the user has conducted a transaction at the merchant frequently in the past and therefore allows the transaction based on the previous number of transactions at the merchant. These examples use multiple types of transaction information, e.g., the date of the transaction, the location of the transaction, the category of the transaction, the amount of the transaction, and the like, to determine if the exceptions apply. In some embodiments, only a single piece of transaction information applies. For example, the system may always permit transactions that are associated with a specific category, for example, emergency expenses. The system may always permit transactions at emergency rooms, doctors' offices, and the like.

In some embodiments, the exceptions are determined by the system and/or the user. For example, the system may provide a list of exceptions based on the user's transaction history. If the user has a favorite coffee shop, the system may allow transactions at the coffee shop up to a certain amount even if the transaction would not meet a limit. The user or an administrator may provide exceptions based on location or other transaction information. For example, the user may input exceptions that allow transactions within a specific region, e.g., a city, that would not be allowed outside of the specific region. The exceptions may be changed at any time by the system or user.

The exceptions may be limited by frequency, amount, percentage of the limit, or the like. For example, a transaction may qualify for an exception but only up to a certain percentage of the funds remaining in a related category. For example, a transaction may qualify for an exception because the expense period for the token is almost expired and there are remaining funds in a first category. The system may permit a transaction in a second category up to some percentage (e.g., 50%) of the funds remaining in the first category.

The transaction-responsive limits are designed to provide flexibility to the system and better serve the user. The transaction-responsive limits may be tailored to the user or generic to the token and/or system. By providing for transaction-responsive limits, the system allows transactions that would otherwise be denied based on binary yes/no limits when the transaction information indicates the appropriateness of the transaction.

In some embodiments, a new user 2 may be periodically added to the collaborative group of users 2. As such, in some embodiments, new users 2 are added. The account associated with the shared token may receive additional funding from the new user 2.

In some embodiments, the shared token may be disassociated from the user 2 (e.g., user payment device 4, user digital wallet, or the like) in order to remove the user 2 from the collaborative group of users 2. The administrator of the client (e.g., business client, retail client, or the like) may prevent one or more users 2 in the group of users 2 from utilizing the shared token. For example, the administrator may remove the shared token or link to the shared token from the payment or digital wallet of the user 2. In another embodiment, the administrator may block of the use of the token by the specific user 2. The administrator may also replace the token for all of the other users 2 in the collaboration group except for the user 2 that is to be removed from the collaboration group. In still other embodiments, the token may remain with the user 2, however, when user information is captured during the transaction and sent for authorization the transaction may be denied by the institution storing the request to prevent the user 2 from continuing to use the shared token. In other examples, instead of the shared token being disassociated from the user 2 the token information that links the payment device (e.g., digital wallet) to the shared token may be disassociated from the user 2 (e.g., the payment device 4).

In some embodiments, when the shared token or link to the shared token is dissociated from the user 2, or the user 2 is otherwise prevented from using the shared token, a portion of the user's remaining funds contributed to the account may be returned to the user 2. As discussed, the purchases made by each user 2 may be tracked, and in one embodiment the disassociated user 2 is refunded a portion of his contribution, based in part on the disassociated user's contribution, the purchases made by the dissociated user 2, distributions taken by the dissociated user 2 in the past, the purchases made by other user's associated with the shared token, the limits related to use of the funds by the users 2, or the like.

In some embodiments of the invention the limits on the tokens, users 2, payments devices 4, accounts, or the like may be edited as the business clients, retail clients, or the like (e.g., administers of the client) have changing needs related to controlling the transactions of the users.

In one embodiment, the tokens, accounts, users 2, limits, or the like may be created and assigned as described herein through the use of graphical interfaces that allows the administrator within the business client, retail client, or the like to manage the use of the shared token as desired.

Embodiments of the invention have been described herein as being related to a shared token that may be utilized by a collaborative group of users 2. In other embodiments of the invention there may be more than one shared token associated with a user 2, payment device 4 of the user 2, a digital wallet associated with the payment device 4, or the like.

In still other embodiments of the invention, instead of using a single shared token for the collaborative group of users 2, multiple shared tokens may be provided to the collaborative group of uses 2. The multiple shared tokens may be associated with a single account or multiple accounts for the collaborative group of users 2. As such, when entering into a transaction the user 2 may select the token, account, or the like that the user 2 would like to utilize in the transaction. Moreover, if the token associated with a single user becomes misappropriated then only the single token for the specific user 2 is replaced instead of having to replace the shared with all of the users 2.

As such, in some embodiments of the invention instead of providing a shared token for use by a collaborative group of users 2, each individual user 2 is associated with one or more individual tokens (e.g., unique tokens) associated with the collaborative account. Moreover, if the user 2 has multiple payment devices 4, the individual tokens for a single user 2 may be different for each separate payment device 4. For example, in the case of a business client, a plurality of tokens may be associated with a business account (e.g., a corporate card account) that the employee users 2 may utilize in order to enter into transactions related to the business. As an example, a first token associated with a first business account may also be associated with a first employee user 2. A second token associated with the first business account may be associated with a second employee user 2. In addition, a third token associated with a second business account may also be associated with a first employee user 2. As such, the first employee user 2 may be associated with multiple tokens, which may each be associated with individual business accounts (e.g., business account 1 and business account 2, or the like). Additionally, a first employee user 2 and a second employee user 2 may be associated with the same business account through the use of different tokens.

In other embodiments, in the case of a retail client, a plurality of tokens may be associated with an account of the administrator (e.g., parents may associate the tokens with one or more savings, checking, or other like accounts owned by the parents). As discussed with respect to an employee user 2, a retail user 2 may also be associated with one or more tokens that are each associated with one or more separate accounts. For example, a first retail user 2 may be associated with a first token and a second token, wherein the first token is associated with a first retail account (e.g., a debit account) and a second token is associated with a second retail account (e.g., a credit account). Additionally, a second retail user 2 may be associated with the first retail account and the second retail account using a third token and a fourth token, respectively.

In other embodiments of the invention the individual users 2, and thus, the individual tokens associated with the users 2 may be categorized into various accounts, groups, sub-groups, or the like. As such, the individual tokens and individual users 2 may not only be associated on an individual level, but may also be associated with other users 2 and groups. For example, the client or administrator may associate individual users 2 with various accounts (e.g., user 1 and user 2 may both be associated with account 1, while user 1 is also associated with account 2). The individual users 2 within an account or across accounts may also be categorized into groups of users 2, such as a first set of users 2 being associated with a first group (e.g., sales group), and a second set of users 2 being associated with a second group (e.g., procurement group, engineering group, account group, or the like). Moreover, individual users 2 within a group may be associated with sub-groups, such as the users in the first group may be further defined into a first sub-group (e.g., sales team 1) and a second sub-group (e.g., sales team 2). The sub-groups may further be divided into additional sub-groups until the individual user level is reached. As such, the users 2 may be structured into hierarchal levels within a business client, in order to place limits on the use of one or more of the business accounts based on the hierarchal levels.

In addition to the users 2, or in the alternative, the tokens that are associated with the individual users may be categorized into the hierarchal levels described above (e.g., account level, group level, sub-group level, additional sub-groups, an individual level, or the like). In one embodiment the individual tokens are categorized together after they are assigned to the users 2 and as the users 2 are categorized into the various levels. Alternatively, the tokens may be categorized together before the users 2 are categorized, and thus assigned to the users 2, in part, based on the categories to which the tokens are assigned. For example, a set of tokens may be assigned to a specific account and this set of tokens may be further categorized into a first token group and a second token group. As is the case with the users 2, the first token group may be further divided into a first sub-group, a second sub-group, or the like. Each of the tokens within a sub-group may be further divided into additional sub-groups. As such, the tokens may be categorized and assigned to different accounts, group, sub-groups or the like, and on the individual user level.

By categorizing the tokens and/or the users 2 into the various levels, this may allow the client (e.g., the administrator) to place limits on a global level, account level, group level, sub-group level, or the like, as well as the individual level. For example, a business client can control the transactions of employee users 2 globally, within teams or groups of employees, and/or on individual employees. In another example, this may allow a retail client to set limits on groups of retail users 2 (e.g., children, trust beneficiaries, grandparents, legal dependents, or the like).

As discussed throughout this application the individual tokens may also be associated with digital wallets, as such the tokens, users 2, and accounts may further be grouped based on the one or more digital wallets with which each is associated.

As such, as was the case with the shared token, one or more limits may be placed on the individual tokens, users 2, accounts, digital wallets, or the like as discussed throughout this application. In some embodiments of the invention, the limits may be placed on the tokens, the users 2 (e.g., the individual users, the sub-group of users, the group of users, or the users associated with an account, or the like based on the tokens or the users), the digital wallets of the users 2, or the actual accounts listed within the digital wallets. For example, when the limits are placed on the token, if the token becomes compromised and replaced with another token, the limits may be lost or have to be transferred to the new replacement token. As such, in some embodiments when a token is replaced the limits are transferred to the new token, while in other embodiments the limits may have to be reinstated. In other embodiments, the limits may be associated with the individual users, groups of users, sub-groups of users, or the like. This allows the different limits to be placed on the users globally, on multiple users, or on individual users 2 as necessary. As such, in these embodiments when a token is compromised and requires replacement, the limits may not be affected because the limits are not specifically tied to the tokens.

In addition, the limits may be further placed on the digital wallet or individual accounts within the digital wallet. For example, users 2 may utilize a first account and a second account associated with a digital wallet. The users 2 may be within the same sub-groups and groups, but the first account and the second account may have different limits or the same limits. Alternatively, the first account and second account may be associated with different sub-groups and groups, and either have different limits or the same limits. It should be understood that any combination of limits described herein may be used to set various limits on different levels described within this specification, or on levels not specifically described within this specification.

The transactions that utilize an individual token may be processed in the same way as described with respect to the processes illustrated in FIGS. 1-3 and described in further detail above. As such, when a transaction request is received a determination is made as to if the transaction associated with the individual token being used meets the limits. In one embodiment the highest levels of limits (e.g., global limits) may be asserted first, then the next levels of limits (e.g., account limits, group limits, sub-group limits, or the like) may be asserted next, then the individual user level of limits (e.g., individual user limits, token limits, specific digital wallet limits, or the like) may be asserted in order to determine if the transaction should be allowed or denied. In other embodiments of the invention, the inverse may occur, and as such the individual limits may be asserted first, then the sub-group or group limits, the account limits, and finally the global limits. In other embodiments of the invention, the limits may be asserted in any order.

If the transaction (e.g., transaction information) fails to meet the limits, the transaction may be denied. Alternatively, if the transaction (e.g., transaction information) meets the limits then transaction may be allowed.

As stated and described above, limitations may be applied to the use of an account associated with a token to help regulate or control user transactions. Utilizing limitations on the use of the account associated with the token provides flexibility on applying limits and may further increase security surrounding the unauthorized use of a user account and transmittal of transaction information, account information, monetary funds, or other potentially sensitive information.

The limits discussed herein may include limiting a transaction by a predetermined number of merchants 10 (e.g., a finite number of allowable/deniable merchants 10), a particular group of merchants 10 or one or more merchant categories, (e.g., only grocers), a product type, a group of products or product categories (e.g., only food or gasoline purchases), an amount limit associated with the transaction (e.g., no transaction amounts above a predetermined threshold are allowed, or a minimum transaction amount), a history of purchases, user behavior, a frequency of purchases, a geographic location (e.g., no transactions allowed outside of a predetermined range, specific merchant, area, zip code, city, county, state, country, radius from a specified point, route along one or more roads), a period of time (a time, a day, a month, a year, a quarter) or the like. One or more limits may be assigned singularly or in combination with other limits to either one or more users 2, the token, a device or application associated with a user 2 or a token, an account, a digital wallet, or the like. The limits may be defined or configured by the user 2, by an administrator, by an agent associated with the entity, by a third party, or the like based on need. Configuring the limits may require authentication (e.g., a password), device authentication, or another type of authentication. The entity instituting the limits may be enabled to assign the limits to the user 2, the token, or both, or a device, an account, a digital wallet, or the like.

For example, a child may be limited by a $10-a-day weekday spending budget that is suspended on the weekends. However, the weekend may impose different limits to the token associated with the child's account, as it may be limited to transactions with merchants who sell food, gasoline, wherein entertainment venues are restricted. These limits may be defined by the parent through the method described herein, namely FIGS. 1-6.

In some embodiments, limitations may be placed on the individual users 2. Any transaction associated with the user 2 may be monitored or stored as transaction information by the present invention, which may then determine if the transaction is allowed or denied based on the predetermined limitations associated with the user 2. Associating limits on a user level allows for easy replacement of tokens when a token is misappropriated (e.g., when a token is lost) since the limits remain associated with the user 2 regardless of the token used. Limitations associated with the user 2 may also include an association with an account or a device (e.g., a smart phone, a tablet, or the like) known to be owned or operated by the user 2. Limits may further be associated with one user 2, multiple users, a group of users, or all users. The limitations may be statically or dynamically assigned to the user 2. For example, the user 2 may have a spending limit associated with an account on alternating weeks. One week the user 2 may have a spending limit, but the next week the limit may be removed or altered to include a geographic limit. One or more users 2 may be assigned to the same limits, or different limits.

In other embodiments, the limitations may be placed on the tokens. Any transaction associated with the token may be monitored or stored as described by the present invention herein, which may then determine if the transaction is allowed or denied based on the limitations associated with the token. Additionally, by associating the limitations with the token instead of the user 2, the system may more simply replace a first token with one or more limits with a second token with one or more different limits instead of having to log into an account to change the limits associated with account or the user 2 on an as-needed basis. In other embodiments of the invention the token may remain the same and the limits on the token may change. The limitations may be statically or dynamically assigned to the token. Limitations associated with the token may also include an association with an account or a device (e.g., a smart phone, a tablet, or the like) known to have access to an account associated with the token.

In another example, two users may both have access to a joint account (e.g., a pre-funded business account) that has a maximum spending limit of $1,000 for a week-long business trip to City 1. The token associated with the joint account, may include limits that authorize transaction requests that are initiated within a 25-mile radius of City 1, or at predetermined travel stops (e.g., airports, bus stops, gas stations, restaurants, hotels, or the like) in route to City 1 for the week of the trip. In some embodiments, the two users may be issued the same token associated with the same account. If one of the two users loses his token (or the security of his token is otherwise compromised) then a new replacement token may be issued to one or both of the users. Preexisting limits associated with the token may be required to be reinstated on the newly issued tokens. Alternatively, the preexisting limits may also be automatically transferred to the newly issued replacement token. In other embodiments, the two users may each be issued an individual token associated with the same joint account. If one of the two users loses his token (or the security of his token is otherwise compromised) then a new token may be issued to only one of the users, namely the user who lost his token. Preexisting limits associated with the token may be required to be reinstated on the newly replacement issued token, or may be automatically transferred to the newly issued replacement token.

In continuing with the same example as above, if the limits are placed on the account (e.g., global limits) and the users 2 (e.g., individual user 2 level) then when the tokens are replaced there is no needed to worry about changing the limits on the token or reinstituting the limit because the limits are not associated with the token. However, if there are a large number of users (e.g., 10, 20, 50, 100, 500, 1000, or the like) it may be difficult to continuously monitor the transaction limits of each of the users 2 and change the limits as the needs of each individual user 2 changes. Instead, it may be more efficient to control the limits based on a token level as explained below.

When the limits are associated with a token it may be easier to edit the limits of current tokens by simply pushing (or allowing a user to pull) new tokens into the account whenever the limits change. For example, if the user's 2 configured limits (e.g., a spending limit at entertainment-related merchants) are to be modified for a period of time (e.g., no transactions after 6 pm), the present invention may issue a new token that prevents transactions after 6 pm. In some embodiments, when the token expires the limits on the account are removed. Therefore, the present invention may not be required to constantly update limit configurations, but rather simply issue a new token to the user (or alternatively remove a token from the user). As such, the token may be associated with a specific account, and may further be associated with specific limits. For example, if the user 2 is on a business trip and needs to take a customer on a last minute dinner, the employer (e.g., administrator) may issue the user a new token that can be used for a specific restaurant at a specific time in order to allow a transaction that might not have been previously allowed. In this way the token is provided to the user 2 and it may disappear after the time period is extinguished and/or the transaction is completed. Therefore, the user 2 or multiple users 2 may have real-time access to a larger pool of funds (e.g., a business count) based on access to a token, as well as limits associated with the token or the user 2. If the limits were based on the user 2 the administrator or other entity may have to first modify the limits associated with the user 2 to allow the transaction and thereafter change the limits associated with the user 2 again after the transaction occurs. Thus, the token may serve as a temporary access point to an account. In another example, in a collective group of users 2 instead of allowing all of the users 2 within the collaborative group of users 2 the same access to the account, the administrator or other entity may provide each user 2 multiple tokens (e.g., single use or multi-use tokens) that may be used for specific types of transactions with specific limits. If the limits need to change for the one or more users 2, some of the tokens may be removed and additional tokens may be provided to the users 2 with new limits as opposed to manually configuring the limits associated with each of the users 2. For example, one user in the collaborative group may receive five (5) $20 tokens that can be used specifically at various merchants 10. As the funds are used for each of the tokens the tokens may disappear. Alternatively, another user in the collaborative group of users 10 may receive $100 tokens that can be used to enter into transactions for the hotel rooms of the collaborative group of users 10.

A combination of utilizing limitations on both a global user and/or token scale (e.g., a total spending limit for token associated with a joint account) and an individual user and/or individual token scale (e.g., individual spending limits for each individual user 2 or individual tokens) may provide secure control and regulation of spending with flexibility in limiting transactions in a number of different ways. As an example, limitations can be placed on the user 2 in conjunction with limitations associated with a shared token associated with the joint account. For example, the shared token may have a $1,000 limit, which is further broken down on a user level such that one user may have a spending limit of $700 out of the total $1,000, while the other user may have spending limit of $300 out of the total $1,000. These limitations may help enable the joint account holder (e.g., a corporate account) to effectively manage the overall spending budget while also controlling the spending budgets of each user 2.

The present invention may include means for defining, selecting, modifying, adding, or deleting limitations associated with the user, the token, or the account, as well as for grouping users 2 together. The priority or precedence order of how limitations are applied (e.g., limiting the user 2 before the token, limiting the token before the user, or limiting both the user and the token concurrently) may be configured as well. Limitations may be controlled by a user 2 or by someone else (e.g., a merchant, the issuing financial institution, a representative associated with an entity, a third party, a tokenization service, or the like). The limitations may be effective for a predetermined period of time or independently of time.

With respect to shared tokens and/or payment credentials as discussed herein the system may be further configured to push shared information and/or supplemental offers to multiple digital wallets associated with the users linked to the shared token and/or payment credentials. For example, multiple user's may receive supplemental information related to the available balance and transaction history of a shared token such that they can track each other's spending habits.

Referring to FIG. 4, a network environment is illustrated in accordance with embodiments of the present invention. As illustrated in FIG. 4, the remote server 402 is operatively coupled via a network 401 to the mobile device 404 and/or a point of transaction (POT) 406. In this configuration, the remote server 402 may send information to and receive information from the mobile device 404 and/or the POT 406. Additionally, the mobile device 404 may send and receive communications directly from the POT 406. The remote server 402 may be or include one or more network base stations or other network components. FIG. 4 illustrates only one example of an embodiment of a network environment 400, and it will be appreciated that in other embodiments one or more of the systems, devices, or servers may be combined into a single system, device, or server, or be made up of multiple systems, devices, or server.

The network 401 may be a global area network (GAN), such as the Internet, a wide area network (WAN), a local area network (LAN), a telecommunication network or any other type of network or combination of networks. The network 401 may provide for wireline, wireless, or a combination wireline and wireless communication between devices on the network 401.

In some embodiments, the user 405 is an individual who maintains cellular products with one or more providers.

As illustrated in FIG. 4, the remote server 402 generally comprises a communication device 450, a processing device 452, and a memory device 454. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combination of the foregoing. Control and signal processing functions of the system are allocated between these processing devices according to their respective capabilities. The processing device may include functionality to operate one or more software programs based on computer readable instructions thereof, which may be stored in a memory device.

The processing device 452 is operatively coupled to the communication device 450 to communicate with the network 401 and other devices on the network 401. As such, the communication device 450 generally comprises a modem, server, or other device for communicating with other devices on the network 401.

As further illustrated in FIG. 4, the network remote server 402 comprises computer readable instructions 458 of an application 460. In some embodiments, the memory device, 454 includes data storage 456 for storing data related to and/or used by the application 460. The application 460 may perform one or more of the steps and/or sub-steps discussed herein and/or one or more steps not discussed herein. For example, in some embodiments, the application 460 may determine a one or more stored offers or supplemental information to be communicated to the user.

As illustrated in FIG. 4, the mobile device 404 generally comprises a communication device 430, a processing device 432, and a memory device 434. The processing device 432 is operatively coupled to the communication device 430 and the memory device 434. In some embodiments, the processing device 432 may send or receive data from the mobile device 404, to the remote server 402 via the communication device 430 over a network 401. As such, the communication device 430 generally comprises a modem, server, or other device for communicating with other devices on the network 401.

As further illustrated in FIG. 4, the mobile device 404 comprises computer readable instructions 438 stored in the memory device 434, which in one embodiments includes the computer-readable instructions 438 of an application 440. In the embodiment illustrated in FIG. 4, the application 440 allows the mobile device 404 to be linked to the remote server 402 to communicate, via a network 401. The application 440 may also allow the mobile device to connect directly (i.e. locally or device to device) with the POT 406 for performing a transaction. The application 440 may perform one or more of the steps and/or sub-steps discussed herein and/or one or more steps not discussed herein. For example, in some embodiments, the application 440 may determine that the user is requesting to receive supplemental account information related to his/her payment credential.

As illustrated in FIG. 4, the POT 406 may include a communication device 410, a processing device 412, and a memory device 414. The processing device 412 is operatively coupled to the communication device 410 and the memory device 414. In some embodiments, the processing device 412 may send or receive data from the mobile device 404 and/or the remote server 402 via the communication device 410. Such communication may be performed either over a direct connection and/or over a network 401. As such, the communication device 410 generally comprises a modem, server, or other device for communication with other devices on the network 401.

As further illustrated in FIG. 4, the POT 406, comprises computer-readable instructions 418 of an application 420. In the embodiment illustrated in FIG. 4, the application 420 allows the ATM 406 to be linked to the remote server 402 to communicate, via a network 401. The application 420 may also allow the mobile device 406 to connect directly (i.e., locally or device to device) with the POT 406 or indirectly through the network 401. The application 420 may perform one or more of the steps and/or sub-steps discussed herein and/or one or more steps not discussed herein.

It is understood that the servers, systems, and devices described herein illustrate one embodiment of the invention. It is further understood that one of more of the server, systems, and devices can be combined in other embodiments and still function in the same or similar way as the embodiments described herein.

In various embodiments, the POT device may be or include a merchant machine and/or server and/or may be or include the mobile device of the user may function as a point of transaction device. The embodiments described herein may refer to the use of a transaction, transaction event or point of transaction event to trigger the steps, functions, routines etc. described herein. In various embodiments, occurrence of a transaction triggers the sending of information such as alerts and the like. Unless specifically limited by the context, a "transaction", "transaction event" or "point of transaction event" refers to any communication between the user and the merchant, e.g. financial institution, or other entity monitoring the user's activities. In some embodiments, for example, a transaction may refer to a purchase of goods or services, a return of goods or services, a payment transaction, a credit transaction, or other interaction involving a user's bank account. As used herein, a "bank account" refers to a credit account, a debit/deposit account, or the like. Although the phrase "bank account" includes the term "bank," the account need not be maintained by a bank and may, instead, be maintained by other financial institutions. For example, in the context of a financial institution, a transaction may refer to one or more of a sale of goods and/or services, an account balance inquiry, a rewards transfer, an account money transfer, opening a bank application on a user's computer or mobile device, a user accessing their e-wallet or any other interaction involving the user and/or the user's device that is detectable by the financial institution. As further examples, a transaction may occur when an entity associated with the user is alerted via the transaction of the user's location. A transaction may occur when a user accesses a building, uses a rewards card, and/or performs an account balance query. A transaction may occur as a user's mobile device establishes a wireless connection, such as a Wi-Fi connection, with a point-of-sale terminal. In some embodiments, a transaction may include one or more of the following: purchasing, renting, selling, and/or leasing goods and/or services (e.g., groceries, stamps, tickets, DVDs, vending machine items, etc.); withdrawing cash; making payments to creditors (e.g., paying monthly bills; paying federal, state, and/or local taxes and/or bills; etc.); sending remittances; transferring balances from one account to another account; loading money onto stored value cards (SVCs) and/or prepaid cards; donating to charities; and/or the like.

In some embodiments, the transaction may refer to an event and/or action or group of actions facilitated or performed by a user's device, such as a user's mobile device. Such a device may be referred to herein as a "point-of-transaction device". A "point-of-transaction" could refer to any location, virtual location or otherwise proximate occurrence of a transaction. A "point-of-transaction device" may refer to any device used to perform a transaction, either from the user's perspective, the merchant's perspective or both. In some embodiments, the point-of-transaction device refers only to a user's device, in other embodiments it refers only to a merchant device, and in yet other embodiments, it refers to both a user device and a merchant device interacting to perform a transaction. For example, in one embodiment, the point-of-transaction device refers to the user's mobile device configured to communicate with a merchant's point of sale terminal, whereas in other embodiments, the point-of-transaction device refers to the merchant's point of sale terminal configured to communicate with a user's mobile device, and in yet other embodiments, the point-of-transaction device refers to both the user's mobile device and the merchant's point of sale terminal configured to communicate with each other to carry out a transaction.

As used herein, a "user device" or "mobile device" may be a point-of-transaction device as discussed, or may otherwise be a device carried by a user configured to communicate across a network such as a cellular network, wireless fidelity network or otherwise. As used here a "user" refers to a previous customer or a non-customer of one or more merchants or entities associated with one or more merchants.

In some embodiments, a point-of-transaction device is or includes an interactive computer terminal that is configured to initiate, perform, complete, and/or facilitate one or more transactions. A point-of-transaction device could be or include any device that a user may use to perform a transaction with an entity, such as, but not limited to, an ATM, a loyalty device such as a rewards card, loyalty card or other loyalty device, a magnetic-based payment device (e.g., a credit card, debit card, etc.), a personal identification number (PIN) payment device, a contactless payment device (e.g., a key fob), a radio frequency identification device (RFID) and the like, a computer, (e.g., a personal computer, tablet computer, desktop computer, server, laptop, etc.), a mobile device (e.g., a smartphone, cellular phone, personal digital assistant (PDA) device, MP3 device, personal GPS device, etc.), a merchant terminal, a self-service machine (e.g., vending machine, self-checkout machine, etc.), a public and/or business kiosk (e.g., an Internet kiosk, ticketing kiosk, bill pay kiosk, etc.), a gaming device, and/or various combinations of the foregoing.

In some embodiments, a point-of-transaction device is operated in a public place (e.g., on a street corner, at the doorstep of a private residence, in an open market, at a public rest stop, etc.). In other embodiments, the point-of-transaction device is additionally or alternatively operated in a place of business (e.g., in a retail store, post office, banking center, grocery store, factory floor, etc.). In accordance with some embodiments, the point-of-transaction device is not owned by the user of the point-of-transaction device. Rather, in some embodiments, the point-of-transaction device is owned by a mobile business operator or a point-of-transaction operator (e.g., merchant, vendor, salesperson, etc.). In yet other embodiments, the point-of-transaction device is owned by the financial institution offering the point-of-transaction device providing functionality in accordance with embodiments of the invention described herein.

Referring now to FIG. 5, a high level process flow for providing supplemental account information within digital wallets 500 is illustrated in accordance with one embodiment of the present invention, which will be discussed in further detail throughout this specification. As illustrated, the method may comprise a plurality of steps, including but not limited to, receiving a request, from a user, to provide supplemental account information related to a payment credential associated with a digital wallet maintained on the user's mobile device, wherein the payment credential is associated with an account 510, authenticating the user's identity based at least partially on one or more authentication credentials, wherein authenticating the user's identity comprises verifying the user is an account holder associated with the account, in response to authenticating the user's identity 520, providing access to an application programming interface configured to push supplemental account information to digital wallets associated with the payment credential, wherein the application programming interface is associated with at least one database maintained by an entity that issued the account 530, receiving, via the application programming interface from the at least one database, supplemental information related to the payment credential 540, and presenting, on a display of the mobile device, the supplemental information related to the payment credential 550.

As represented by step 510, the system first receives a request, from a user, to provide supplemental account information related to a payment credential associated with a digital wallet maintained on the user's mobile device. The payment credential may be additionally associated with an account that has been issued to the user by a particular entity.

In some embodiments, the payment credential is associated with a financial account that is maintained by a financial institution. For example, in such an embodiment, the payment credential may a 16-digit debit card number associated with a debit card issued to the user and linked to a debit and/or savings account maintained by the financial institution, a 16-digit credit card number associated with a credit card issued to the user and linked to a credit account maintained by the financial institution, an account number associated with a financial account maintained by the financial institution, or the like.

In some embodiments, the payment credential is associated with a merchant account that is maintained by a third party merchant. In some embodiments, the merchant account may accrue rewards and/or loyalty points, or the like, that are redeemable for monetary value. For example, in such an embodiment, the payments credential may be a rewards card number issued to the user and linked to a rewards account that is maintained by the third party merchant, a gift card that is issued to the user and liked to a rewards account that is maintained by the third party merchant, a rewards account number that is issued to the user and linked to a rewards account that is maintained by the third party merchant, a payment account number that is issued to the user and linked to a payment account that is maintained by the third party merchant or the like.

In some embodiments, the system is further configured to display, on the user's mobile device via a graphical user interface (GUI) associated with the digital wallet, a message and/or a prompt which indicates that the user may enable the digital wallet to receive supplemental account information related to the payment credential and/or more specifically the account linked to the payment credential. The system may present the user with an option to enable the digital wallet to receive supplemental account information related to a payment credential that is included in the account. For example, in one embodiment the message may be presented on a selectable icon displayed in the digital wallet such that the user may enter a digital wallet on their mobile device and select to view a payment credential, in response the system may present the user a message stating "click here to view additional account details". In response to the user selecting the message the system may receive an indication that the user is requesting to receive supplemental account information related to the payment credential.

In some embodiments, prior to receiving the request for supplemental account information related to the payment credential the system may first receive a request to associate the payment credential with a digital wallet maintained on a user's mobile device, and in response to receiving the request, associate the payment credential with the digital wallet maintained on the user's mobile device. For example, in one embodiment the payment credential may be a debit card such that the user may enter a digital wallet on their mobile device and select to add a new payment credential, the system may then request the user provide information such as the debit card number, expiration date, card verification code (cvc), the user's name (as listed on the account associated with the debit card), and the zip code associated with the debit card). In response to receiving, and verifying the accuracy of the received information, the system may then associate the payment credential with the digital wallet. Associating the payment credential with the digital wallet may comprise locally storing the received information on the mobile device, or remotely storing the received information on a remote server associated with the mobile device and/or the digital wallet. To the extent that any person with possession of the user's computing device may be capable of viewing general information within the digital wallet, in some instances the user's identity must be verified prior to the system providing supplemental account information within the digital wallet as it may be associated with sensitive user information and/or data. Thus, as represented by step 520, after receiving a request to provide supplemental account information the system may then authenticate the user's identity based at least partially on one or more authentication credentials. Authenticating the user's identity may further comprise verifying that the user is an account holder associated with the payment credential account.

Authenticating the user's identity may further comprise sending the user a request to provide one or more authentication credentials for authenticating the user's identity. The type of authentication credentials that the system may request from the user may be defined by the entity responsible for issuing the payment credential and maintaining the account associated with the payment credential. Requesting, from the user, one or more authentication credentials may comprise presenting, on a GUI associated with the digital wallet, a request form where the request form indicates the authentication credentials the user is required to provide in order to verify their identity. The request form may additionally verify that the information which the user enters into the request form is valid according to predetermined rules for the authentication credentials. For example, if an authentication credential required for verifying the user's identity is a personal identification number (PIN) associated with the payment credential, a predetermined set of rules may specify that the PIN be a specific length such that if the amount of characters that the user enters into the credential field is less the length required for the PIN the request form may display an error message indicating the PIN is "too short", allowing the user to correct their mistake prior to submitting the provided authentication credentials for validation.

In some embodiments, the user may have a user account associated with the digital wallet such that the required authentication credentials may have been previously provided and stored and/or associated with the digital wallet. As such, the digital wallet may have access to a variety of user information, including but not limited to, the user's name, address, telephone number, email address and the like. In such an embodiment, the system may automatically acquire at least a portion of the authentication credentials for use in authenticating the user's identity. For example, if an authentication credential required for authenticating the user's identity is a user email address and the user provided his or her email address during an account setup associated with the digital wallet, the system may automatically acquire the email address from the digital and insert the email address into the request form prior to presenting the request form to the user via a display associated with their mobile device. In some embodiments, the user has a mobile device application associated with the payment credential and/or the account associated with the payment credential (e.g. mobile banking application). As such, the digital wallet may request to communicate with the mobile device application to access a variety of user information.

After requesting the one or more authentication credentials, the system then receives the one or more authentication credentials from the user. In some embodiments, receiving the one or more authentication credentials further comprises verifying that the authentication credentials are valid according to predetermined rules for the authentication credentials.

For example, if an authentication credential required for the primary level of user authentication is a date of birth and social security number associated with the user's account, the system may first verify that the user has entered a valid date of birth and social security number. If it is determined that the user entered an invalid the system may display an error message informing the user that the received credential was invalid and request that the user provide a valid authentication credential.

After receiving the one or more authentication credentials, the system may verify the one or more authentication credentials such that it results in an authentication of the user's identity and subsequently verifies that the user is an intended account holder associated with the account. In some embodiments, authenticating the user's identity comprises comparing the received authentication credentials to information that is stored in a database and maintained by the entity that issued the payment credential. If the system determines that the received authentication credentials are accurate with reference to the stored information then the system may authenticate the user's identity.

As represented by step 530, in response to authenticating the user's identity, the system may receive access to a provided application programming interface that is configured to push the supplemental account information to digital wallets with which the payment credential is associated. Where the application interface may be provided by an entity responsible for issuing and/or maintaining the account associated with the payment credential. To this extent, the application programming interface may be additionally associated with and/or linked to at least one database and/or remote server that is maintained by the entity responsible for issuing and/or maintaining the account associated with the payment credential. For example, in one embodiment, the payment credential is associated with a financial institution account such that the application programming interface is associated with at least one database maintained by the financial institution. In another embodiment, the payment is associated with a third party merchant account such that the application programming interface is associated with at least one database maintained by the third party merchant.

The application programming interface may be configured to communicate between the digital wallet and the at least one database and/or remote server that is maintained by the account issuing entity. As used herein, an "application programming interface" may refer to a software interface that provides a means for a software application (e.g., the digital wallet) to communicate with a remote application over a network (e.g., the Internet) through a series programming commands that call and/or invoke a routine to execute a specific process. In one embodiment, the application programming interface may communicate back and forth between the digital wallet and the at least one database and/or server through web services. As used herein "web services" may refer to a collection of technological standards and protocols by which software applications communicate over a network such as the internet (e.g. Extensible Markup Language (XML)). In some embodiments, providing access the application programming interface may further comprise providing access to software programming code embodied by a series of XML messages where each message corresponds to a different function of the remove service.

In some embodiments, providing access the to the application programming interface further comprises determining a level of access for receiving supplemental information related to the payment credential. In some embodiments, the levels of access may be defined by a high, medium, and/or low access tier where the higher the access level the more information the user is able to receive and view from within the digital wallet. For example, if the payment credential is associated with a financial account, a user with a low access level may be able to only view the available balance of the account, a user with a medium access level may be able to view the available balance of the account, and the last five (5) transactions processed using the account, and a user with a high access level may be able to view the available balance of the account, the last In some embodiments, the level of access is determined based at least partially on a level of authentication used for authenticating the five (5) transactions processed using the account, and any pending transactions associated with the account.

In some embodiments, the level of access is determined based at least partially on the level of authentication used for authenticating the digital wallet associated with the payment credential. For example, if access to the digital wallet requires a strict authentication (e.g., security question(s), biometric screening parameter, and the like) the user may receive a high access level to the supplemental information, and if access to the digital wallet requires a lenient authentication (e.g., a digital wallet PIN) the user may receive a low access level to the supplements information. In another embodiment, the level of access is determined based at least partially on the type of account that is associated with the payment credential. For example, a user with a premium account may receive a high access level to the supplemental information whereas a user with a standard account may receive a medium or low access level to the supplemental information. In other embodiments, providing access to the application programming interface further comprises receiving one or more user preferences for determining the level of access for receiving supplemental information. In such an embodiment, the user may define via the user preferences at least one account parameter to be included or excluded in the supplemental information. For example, if the payment credential is associated with a financial account, the user may state in the user preferences that she only wants to receive supplemental information related to her account balance and the transaction details of her last ten (10) purchases. As such, either the user or the entity maintaining the payment credential account may specify a predetermined number of transactions that may be viewed from within the digital wallet. As discussed herein, user preferences may be set from within the digital wallet or from within a platform associated with the entity responsible for maintaining the payment credential such as an online banking platform. For example, a user may set toggles that define what information will be available and viewable from within the digital wallet. If the user preferences are set from a platform associated with the entity responsible for maintaining the payment credential then the user preferences may be subsequently pushed to the mobile wallet.

The supplemental information may comprise various account parameters related to the payment credentials and/or the account associated with the payment credential. In some embodiments, the supplemental information comprises comprehensive transaction details for a predetermined number of transactions previously processed using the payment credential. For example, the payment credential may be a token issued for use with a specific merchant, and the supplemental information may comprise transaction details of the last five (5) purchases the user made with the merchant using the token. However, the supplemental information may also include additional transaction details related to the account that the token is associated with. In some embodiments, the supplemental information comprises comprehensive transaction details for a predetermined number of transactions previously processed using the account associated with the payment credential. For example, the supplemental information may comprise transaction details of the last ten (10) purchases the user made with the account associated with the payment credential. To this extent, the supplemental information may include purchases that were not made using the payment credential and/or the digital wallet. In a specific example, the supplemental information may include the user's last five (5) transactions associated with the account which include a direct deposit from the user's employers, an automatic withdrawal to a utility company, a physical check that the user authorized, and two purchases the user made using the payment credential. In some embodiments, the supplemental information comprises the available balance of the account associated with the payment credential, pending account transactions, and the like. In some embodiments, the supplemental information comprises one or more alerts for the account associated with the payment credential. For example, in one embodiment, the payment credential is associated with a merchant payment account, and the user may receive an alert whenever their available balance falls below a predetermined threshold that has been defined by either the user themselves or a third party (e.g. the merchant). In a specific example, the payment credential may be a card number associated with a card issued to the user on behalf of the local coffee shop such that the user is able to reload the card with monetary funds and receive rewards points for making purchases using the card. If the user's favorite beverage at the coffee shop is $4.00, the user may receive an alert each time their available balance falls below $5.00.

In some embodiments, the supplemental information may comprise one or more alerts related to the user's account and/or payment credential. For example, the system may provide the user with an alert that indicates they have just processed a transaction and/or purchased with a merchant that they have never previously done business with. To this extent, the supplemental information may comprise periodic account and/or payment credential update reports. For example, a periodic update report may comprise a list of new merchants that the user process transactions with in the previous week.

In some embodiments, the system is further configured to send, via the application programming interface to the at least one database, supplemental information related to the account. In such an embodiment, the supplemental information may comprise a request to cancel the payment credential associated with the account. For example, in one embodiment the payment credential may be associated with a financial account, and the user may send information to the financial institution that indicates either the payment credential has been compromised (e.g., lost/stolen debit card) or the financial account has been compromised (e.g., stolen identity), and request the financial institution suspend and/or cancel the payment credentials and restrict access to the account. The user may additionally request that the entity issue a new payment credential to be associated with the account. In some embodiment, sending such information may require an additional authentication of the user's identity.

In some embodiments, the system is further configured to send, to a near field communication (NFC) device, information related to the account maintained by the financial institution. As such the system may level the payment credential and/or the digital wallet for use with an ATM and the like. This may allow the payment credential and/or the digital wallet to be used for ATM access if it is associated with a device that is capable of leveraging a payment credential/token upon approaching an ATM such that the ATM is further enabled by NFC or providing a QR code to send information from that ATM back to the digital wallet. A user may additionally apply a travel flag to their payment credential.

As represented by step 540, the system may utilize the application programming interface to receive the supplemental account information related to the payment credential. In one embodiment, receiving the supplemental information may comprise sending a request, via the application programming interface, to receive the supplemental information related to the payment credential from the at least one database and receiving a response comprising the supplemental information related to the payment credential from the at least one database. As represented by step 550, upon receiving the supplemental information the system may present the supplemental information to the user. The information may be presented on either a display of the mobile device and/or a GUI associated with the digital wallet. In some embodiments, the supplemental information is automatically populated on the digital wallet GUI in a section that is reserved for the related payment credential. In another embodiment, the user may select an option for the information to be presented when they wish to view it and the information may be presented using an expandable viewing option within the GUI of the digital wallet or the user may be directed to a separate page within the digital wallet that is dedicated to the presentation of supplemental account information.

Referring now to FIG. 6, a high level process flow for providing offers associated with payment credentials in digital wallets 600 is illustrated in accordance with one embodiment of the present invention, which will be discussed in further detail throughout this specification. As illustrated, the method may comprise a plurality of steps, including but not limited to, receiving authorization to associate a payment credential with a digital wallet maintained on a user's mobile device, where the payment credential is associated with an account maintained by a financial institution, and where the authorization is provided by the financial institution 610, receiving access to an application programming interface configured to push offers to digital wallets associated with the payment credential, where the application programming interface is associated with at least one database maintained by the financial institution 620, receiving, via the application programming interface from the at least one database, one or more offers, where the offers include at least one incentive for processing payments using the payment credential associated with the account maintained by the financial institution 630, and presenting, to the user on a display of the mobile device, the one or more offers 640. It should be noted that in some embodiments, offers may entail advertisements that are being communicated to the user.

As represented by step 610, the system first receives authorization to associate a payment credential with a digital wallet maintained on a user's mobile device. The payment credential may be associated with an account maintained by a financial institution. In this regard, the financial institution may provide the authorization to associate the payment credential with the digital wallet. In one embodiment, the user may electronically request that the financial institution provision and/or authorize the issued payment credential for use within one or more digital wallets such that upon receiving authorization the payment credential is associated with the one or more digital wallets. For example, the user may login into their online banking account and electronically request that the financial institution provision and/or authorize the issued payment credential for use within one or more digital wallets. In another embodiment, the user may verbally request that the financial institution provision and/or authorize the issued payment credential for use within one or more digital wallets such that upon receiving authorization the payment credential is associated with the one or more digital wallets. For example, the user may verbally request either at a local business center (e.g., a banking branch) or via a customer service call center that the financial institution provision and/or authorize the issued payment credential for use within one or more digital wallets.

In some embodiments, in response to receiving the request, the system may associate the payment credential with a digital wallet maintained on the user's mobile device according to methods previously discussed herein. To this extent, associating the payment credential with a digital wallet maintained on the user's mobile device may requires the system requesting that the user provide additional information to the digital wallet. For example, the user may be required to execute the traditional steps of associating a payment credential with the digital wallet independent of the financial institution authorization. Upon receiving a request and/or an attempt by the user to associate the payment with the digital wallet the system may then verify that the financial institution has authorized the payment credential to be associated with the digital wallet. If it is determined that the financial institution has authorized the payment credential to be associated with the digital wallet the system may proceed to associate the payment credential with the digital wallet. Alternatively, in some embodiments, authorization may be required to associate the payment credential with the digital wallet such that if it is determined that the financial institution has not authorized the payment credentials to be associated with the digital wallet, the system may proceed to deny the request to associate the payment credential with the digital wallet. In other embodiments, authorization directly from the financial institution may not be required to associate the payment credential with the digital wallet such that if it is determined that the financial institution has not authorized the payment credentials to be associated with the digital wallet, the system may proceed to still associate the payment credential with the digital wallet.

In other embodiments, associating the payment credential with a digital wallet maintained on the user's mobile device, in response to receiving authorization, may not require that the user provide additional information to the digital wallet. For example, the authorization may further include all the necessary information required for associating the payment credential with the digital wallet such that upon receiving the authorization the payment credential is automatically associated with digital wallet.

As represented by step 620, in response to verifying that the payment credential was authorized by or through the financial institution to be associated with the digital wallet, the system may receive access to an application programming interface that is configured to push offers to digital wallets that the payment credential is associated with. To this extent, the application programming interface may be additionally associated with and/or linked to at least one database and/or remote server that is maintained by the financial institution. In response to receiving an offer the system may be configured to receive, from the user, an acceptance of the offer for processing payments using the payment credential associated with the account maintained by the financial institution. Where in response to receiving the acceptance of the offer the system may proceed to process payment for a purchase using the authorized payment credential and award the user according to one or more terms and conditions detailed in the offer.

In one embodiment, the system may additionally receive information related to other payment credentials within the digital wallet that are not associated with the financial institution and/or not authorized by the financial institution. In such an embodiment, the system may determine, based at least partially on the received information, one or more offers for processing payments using the payment credential associated with the account maintained by the financial institution. In one embodiment, the received information may comprise pricing information related to payment credentials within the digital wallet that are not associated with the financial institution and/or not authorized by the financial institution. For example, a digital wallet may contain a first payment credential associated with the authorizing financial institution, and a second payment credential not associated with the authorizing financial institution. If a user is purchasing a product for $5, the system may receive information detailing that the product will be $4 if purchased using the second payment credential as such the system may determine to offer the user a $2 discount for purchasing the product using the first payment credential such that the total price of the product including the discount will be $3 and less that the total price of the product including the discount offered by the issuer of the second payment credential.

In one embodiment the one or more offers comprise a pricing discount for a purchase being made by the user. In such an embodiment, the offer may specify that the total price of the purchase including the pricing discount for processing the purchase using the authorized payment credential will be less than the total price of the purchase if processed using another payment credential within the digital wallet. For example, a digital wallet may contain a first payment credential associated with the authorizing financial institution, and a second payment credential not associated with the authorizing financial institution. If a user is purchasing a product for $5, the offer may detail that the price of the product will include a $1 discount and be $4 if purchased using the first payment credential, whereas the price of the product will be $5 if purchased using the second payment credential.

In one embodiment the one or more offers comprise a rewards points incentive for the user. In such an embodiment, the user may have a rewards account associated with the financial institution where the user accumulate rewards such as rewards and/or loyalty points, the offer may specify that the user will receive a predetermined reward or amount of rewards points if the user processes a purchase using the authorized payment credential versus using another payment credential within the digital wallet. As such, the system being further configured to credit one or more rewards points to the user's account in response to processing a payment using the authorized payment credential associated with the account maintained by the financial institution.

In some embodiments authorization may be further provided such that the payment credential is authorized for use with a plurality of third party merchant websites. For example, the user may log into a platform associated with the entity responsible for maintaining the payment credential and follow through a button enrollment process where the user may specify that they want the system to push their payment credentials to a plurality of wallets, third party websites, and/or make them available for bill pay such that the process is embodied by a self-guided one click process where the entity may make recommendations to the user about which companies they should enroll with. Thus, in addition to providing offer to the user the system may also provide offers to the merchant associated with the purchase.

In one embodiment, the one or more offers comprise a financial incentive for the merchant associated with a purchase being made by the user. In such an embodiment, the offer may specify that merchants associated with merchant websites that have been authorized for use with the payment credential may receive a discounted payment interchange fee. As such the system may be further configured to decrease a payment interchange fee associated with the purchase being made by the user in response to processing a payment using the payment credential associated with the account maintained by the financial institution.

As represented by step 630, the system may utilize the application programming interface to receive the offers related to the payment credential. In one embodiment, receiving the offers may comprise sending a request, via the application programming interface, to receive offers related to the payment credential from the at least one database and receiving a response comprising the offers related to the payment credential from the at least one database.

As represented by step 640, upon receiving the offers the system may present one or more offers to the user. The information may be presented on either a display of the mobile device and/or a GUI associated with the digital wallet. In some embodiments, the offers may be automatically populated on the digital wallet GUI in a section that is reserved for information the related payment credential. In another embodiment, the user may select an option for the offer to be presented when they wish to view it and the offer may be presented using an expandable viewing option within the GUI of the digital wallet or the user may be directed to a separate page within the digital wallet that is dedicated to the presentation of offers associated with payment credentials.

Referring now to FIG. 7, a high level process flow for providing offers associated with payment credentials authenticated in a specific digital wallet 700 is illustrated in accordance with one embodiment of the present invention, which will be discussed in further detail throughout this specification. As illustrated, the method may comprise a plurality of steps, including but not limited to receiving a request to provide a digital wallet on a user's mobile device 710, authenticating at least one payment credential for use within the digital wallet 720, receiving access to an application programming interface configured to push offers to digital wallets 730, receiving, via the application programming interface, one or more offers from the at least one database 740, and presenting, to the user on a display of the mobile device, the one or more offers 750.

As represented by step 710, the system first receives a request to provide a digital wallet on a user's mobile device. The digital wallet may be maintained by and/or associated with a third party provider such as a digital wallet provider. It should be noted however, that the digital wallet provider may be an entity directly associated with the user via an account such as a financial institution or merchant. In this regard, the digital wallet provider may provide access to an application to be downloaded on the user's mobile device such that the digital wallet may be embodied by an executable application maintained on the user's mobile device. For example, the user may access a digital distribution platform for downloading mobile applications. In other embodiments, the digital wallet may be provided via a web browser associated with the user's mobile device. To this extent the user may access the digital wallet by accessing and website maintained by the digital wallet provided via an associated web address and providing login credentials to gain access to user specific digital wallet.

As represented by step 720, the system may then authenticate at least one payment credential for use within the digital wallet. For example, in one embodiment the payment credential may be a debit card such that the user may enter a digital wallet on their mobile device and select to add a new payment credential, the system may then request the user provide information such as the debit card number, expiration date, card verification code (cvc), the user's name (as listed on the account associated with the debit card), and the zip code associated with the debit card). In response to receiving, and verifying the accuracy of the received information, the system may then authenticate the payment credential for use within the digital wallet. Authenticating the payment credential with the digital wallet may comprise locally storing the received information on the mobile device, or remotely storing the received information on a remote server associated with the mobile device and/or the digital wallet. Authenticating the payment credential for use within the digital wallet may further comprise authenticating the user's identity and verifying that the user is an account holder associated with the payment credential account as previously discussed herein.

As represented by step 730, in response to authenticating at least one payment credential for use within the digital wallet, the system may receive access to an application programming interface that is configured to push offers to digital wallets. To this extent, the application programming interface may be additionally associated with and/or linked to at least one database and/or remote server that are maintained by the digital wallet provider. In this way, the digital wallet provider may provide users with offers that encourage the use of their specific digital wallet as opposed to other digital wallets the user may utilize. In response to receiving an offer the system may be configured to receive, from the user, an acceptance of the offer for processing payments using the specific digital wallet maintained by the digital wallet provider. Where in response to receiving the acceptance of the offer the system may proceed to process payment for a purchase using the specific digital wallet and award the user according to one or more terms and conditions detailed in the offer.

In one embodiment, the system may additionally receive information related to other digital wallets maintained the mobile, or which the user is associated, that are not associated with the digital wallet provider. The information may be received based on data scraping or other methods. In some embodiments, the user may grant the mobile device access to interchange information between the specific digital wallet and other digital wallets maintained on the user's mobile device. In such an embodiment, the system may determine, based at least partially on the received information, one or more offers for processing payments using the specific digital wallet maintained by the digital wallet provider. In one embodiment, the received information may comprise pricing information related to other digital wallets maintained on the user's mobile device that are not associated with the digital wallet provider. For example, the user's mobile device may contain a first digital wallet associated with the digital wallet provider, and a second digital wallet not associated with the digital wallet provider. If a user is purchasing a product for $5, the system may receive information detailing that the product will be $4 if purchased using the second digital wallet as such the system may determine to offer the user a $2 discount for purchasing the product using the first digital wallet such that the total price of the product including the discount will be $3 and less that the total price of the product including the discount offered by the issuer of the second digital wallet. It should be noted that as used herein "the digital wallet provider" may refer to the digital wallet provider responsible for maintaining the at least one database associated with the application programming interface whereas other digital wallet maintained on the user's mobile device may be associated with other digital wallet providers not responsible for maintaining the at least one database associated with the application programming interface.

In one embodiment the one or more offers comprise a pricing discount for a purchase being made by the user. In such an embodiment, the offer may specify that the total price of the purchase including the pricing discount for processing the purchase using the authorized payment credential will be less than the total price of the purchase if processed using another digital wallet maintained on the user's mobile device. For example, the user's mobile device may contain a first digital wallet associated with the digital wallet provider, and a second digital wallet not associated with the digital wallet provider. If a user is purchasing a product for $5, the offer may detail that the price of the product will include a $1 discount and be $4 if purchased using the first digital wallet, whereas the price of the product will be $5 if purchased using the second digital wallet.

In one embodiment the one or more offers comprise a rewards points incentive for the user. In such an embodiment, the user may have a rewards account associated with the digital wallet where the user accumulate rewards such as rewards and/or loyalty points or financial incentives, the offer may specify that the user will receive a predetermined reward or amount of rewards points if the user processes a purchase using the specific digital wallet maintained by the digital wallet provider versus using another digital wallet maintained on the user's mobile device. As such, the system being further configured to credit one or more rewards points to the user's account in response to processing a payment using the specific digital wallet maintained by the digital wallet provider.

In some embodiments authorization may be further provided such that the digital wallet may have an agreement with a plurality of third party merchant websites for processing payments payable to the third party merchants. Thus, in addition to providing offer to the user the system may also provide offers to the merchant associated with the purchase. In one embodiment, the one or more offers comprise a financial incentive for the merchant associated with a purchase being made by the user. In such an embodiment, the offer may specify that merchants associated with merchant websites that have been authorized for use with the payment credential may receive a discounted payment interchange fee. As such the system may be further configured to decrease a payment interchange fee associated with the purchase being made by the user in response to processing a payment using the specific digital wallet maintained by the digital wallet provider.

As represented by step 740, the system may utilize the application programming interface to receive the offers related to the payment credential. In one embodiment, receiving the offers may comprise sending a request, via the application programming interface, to receive offers related to the payment credential from the at least one database and receiving a response comprising the offers related to the payment credential from the at least one database.

As represented by step 750, upon receiving the offers the system may present one or more offers to the user. The information may be presented on either a display of the mobile device and/or a GUI associated with the digital wallet and or a website associated with the digital wallet. In some embodiments, the offers may be automatically populated on the digital wallet GUI in a section that is reserved for information the related payment credential. In another embodiment, the user may select an option for the offer to be presented when they wish to view it and the offer may be presented using an expandable viewing option within the GUI of the digital wallet or the user may be directed to a separate page within the digital wallet that is dedicated to the presentation of offers associated with the digital wallet.

Any of the features described herein with respect to a particular process flow are also applicable to any other process flow. In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications:

| U.S. Pat. Application Ser. No. | Title | Filed On |
|---|---|---|
| 14/196,816 | MANAGED DIGITAL WALLETS | Concurrently Herewith |
| 14/196,798 | TOKEN COLLABORATION NETWORK | Concurrently Herewith |
| 14/196,802 | FORMATION AND FUNDING OF A SHARED TOKEN | Concurrently Herewith |
| 14/196,364 | LIMITING TOKEN COLLABORATION NETWORK USAGE BY USER | Concurrently Herewith |
| 14/196,373 | LIMITING TOKEN COLLABORATION NETWORK USAGE BY TOKEN | Concurrently Herewith |
| 14/196,809 | LIMITING THE USE OF A TOKEN BASED ON A USER LOCATION | Concurrently Herewith |
| 14/196,813 | AUTHORIZING A TEMPORARY TOKEN FOR A USER | Concurrently Herewith |
| 14/196,030 | CONTROLLING TOKEN ISSUANCE BASED ON EXPOSURE | Concurrently Herewith |
| 14/196,292 | FLEXIBLE FUNDING ACCOUNT TOKEN ASSOCIATIONS | Concurrently Herewith |
| 14/196,350 | ACCOUNT TOKEN ASSOCIATIONS BASED ON SPENDING THRESHOLDS | Concurrently Herewith |
| 14/196,383 | ONLINE BANKING DIGITAL WALLET MANAGEMENT | Concurrently Herewith |
| 14/196,653 | CUSTOMER TOKEN PREFERENCES INTERFACE | Concurrently Herewith |
| 14/196,752 | CREDENTIAL PAYMENT OBLIGATION VISIBILITY | Concurrently Herewith |
| 14/196,919 | PROVIDING SUPPLEMENTAL ACCOUNT INFORMATION IN DIGITAL WALLETS | Concurrently Herewith |
| 14/196,894 | PROVIDING OFFERS ASSOCIATED WITH PAYMENT CREDENTIALS IN DIGITAL WALLETS | Concurrently Herewith |
| 14/196,257 | FOREIGN EXCHANGE TOKEN | Concurrently Herewith |
| 14/196,274 | FOREIGN CROSS-ISSUED TOKEN | Concurrently Herewith |
| 14/196,545 | DIGITAL WALLET EXPOSURE REDUCTION | Concurrently Herewith |
| 14/196,460 | MOBILE DEVICE CREDENTIAL EXPOSURE REDUCTION | Concurrently Herewith |
| 14/196,947 | ATM TOKEN CASH WITHDRAWAL | Concurrently Herewith |
| 14/196,034 | RESTORING OR REISSUING OF A TOKEN BASED ON USER AUTHENTICATION | Concurrently Herewith |
| 14/196,405 | TOKEN USAGE SCALING BASED ON DETERMINED LEVEL OF EXPOSURE | Concurrently Herewith |

What is claimed is:

1. A digital wallet system for use with a specific digital wallet maintained on a mobile device, whereby the digital wallet receives offers within the digital wallet that are associated with electronic tokens authenticated in the specific digital wallet, the system comprising:
   a computing processor; and
   a non-transitory medium storing a module comprising instruction code that when executed by the computing processor cause the computing processor to perform the steps of:
   receiving a request from a mobile device of a user to download an application;
   downloading the requested application to the mobile device of the user;
   accessing, by the downloaded requested application, a digital wallet;
   storing the accessed digital wallet (i) in at least one database or (ii) in a memory of the mobile device;
   associating at least one single-use electronic token with the accessed digital wallet and storing the at least one single-use electronic token in the accessed digital wallet stored (i) in the at least one database or (ii) in the memory of the mobile device;
   authenticating the at least one single-use electronic token;
   receiving, by the downloaded requested application, access to an application programming interface;
   determining, by the application programming interface, other digital wallets located on the mobile device;
   receiving, by the application programming interface, access to the determined other digital wallets located on the mobile device;
   accessing, by the application programming interface, the determined other digital wallets located on the mobile device;
   retrieving, by the application programming interface, information related to the determined other digital wallets located on the mobile device;
   identifying, by the application programming interface, initiation of a purchase having a first purchase price by the user;

determining one or more offers for using the at least one single-use electronic token associated with the accessed digital wallet based on the retrieved information from the determined other digital wallets located on the mobile device;

associating at least one user incentive of the one or more offers with the at least one single-use electronic token;

storing the one or more offers that are associated with the at least one single-use electronic token in the at least one database;

transmitting, via the application programming interface, the one or more offers from the at least one database to the downloaded requested application on the mobile device;

presenting the one or more offers to the user on a display of the mobile device, by the downloaded requested application;

receiving, by the downloaded requested application, from the user, an acceptance of the at least one user incentive from the one or more offers that completes the purchase using the at least one single-use electronic token associated with the accessed digital wallet;

executing the purchase using the at least one user incentive and the at least one single-use electronic token associated with the accessed digital wallet;

transmitting at least one merchant incentive to at least one merchant for processing the purchase using the at least one single-use electronic token; and deleting the at least one single-use electronic token from the accessed digital wallet stored (i) in the at least one database or (ii) in the memory of the mobile device, based on executing the purchase using the at least one single-use electronic token.

2. The system of claim 1, wherein the steps further comprise transmitting the at least one merchant incentive to the at least one merchant by decreasing a payment interchange assessment associated with the purchase being made by the user based on processing a payment using the at least one single-use electronic token associated with the accessed digital wallet.

3. The system of claim 1, wherein presenting the one or more offers comprises presenting a rewards points incentive for the user.

4. The system of claim 3, wherein the steps further comprise crediting one or more rewards points to a rewards account associated with the accessed digital wallet based on processing a payment using the at least one single-use electronic token associated with the accessed digital wallet.

5. The system of claim 1, wherein the steps further comprise receiving permission from the user to access the information related to the determined other digital wallets located on the mobile device, where the determined other digital wallets are not associated with a digital wallet provider maintaining the accessed digital wallet.

6. The system of claim 5, wherein the steps further comprise accessing the determined other digital wallets and retrieving pricing information related to the determined other digital wallets.

7. A computer-implemented method for transmitting offers associated with electronic tokens authenticated in a specific digital wallet, the method comprising:

receiving, by one or more computing device processors, a request from a mobile device of a user to download an application;

downloading, by the one or more computing device processors, the requested application to the mobile device of the user;

accessing by the downloaded requested application, by the one or more computing device processors, a digital wallet;

storing, by the one or more computing device processors, the accessed digital wallet (i) in at least one database or (ii) in a memory of the mobile device;

associating, by the one or more computing device processors, at least one single-use electronic token with the accessed digital wallet and storing the at least one single-use electronic token in the accessed digital wallet stored (i) in the at least one database or (ii) in the memory of the mobile device;

authenticating, by the one or more computing device processors, the at least one single-use electronic token;

receiving, by the downloaded requested application, by the one or more computing device processors, access to an application programming interface;

determining by the application programming interface, by the one or more computing device processors, other digital wallets located on the mobile device;

receiving by the application programming interface, by the one or more computing device processors, access to the determined other digital wallets located on the mobile device;

accessing by the application programming interface, by the one or more computing device processors, the determined other digital wallets located on the mobile device;

retrieving by the application programming interface, by the one or more computing device processors, information related to the determined other digital wallets located on the mobile device;

identifying by the application programming interface, by the one or more computing device processors, initiation of a purchase having a first purchase price by the user;

determining, by the one or more computing device processors, one or more offers for using the at least one single-use electronic token associated with the accessed digital wallet based on the received information from the determined other digital wallets located on the mobile device;

associating, by the one or more computing device processors, at least one user incentive of the one or more offers with the at least one single-use electronic token;

storing, by the one or more computing device processors, the one or more offers that are associated with the at least one single-use electronic token in the at least one database;

transmitting, by the one or more computing device processors, via the application programming interface the one or more offers from the at least one database to the downloaded requested application on the mobile device;

presenting, by the one or more computing device processors, the one or more offers to the user on a display of the mobile device, by the downloaded requested application;

receiving by the downloaded requested application, by the one or more computing device processors, from the user, an acceptance of the at least one user incentive from the one or more offers that completes the purchase using the at least one single-use electronic token associated with the accessed digital wallet;

executing, by the one or more computing device processors, the purchase using the at least one user incentive and the at least one single-use electronic token associated with the accessed digital wallet;

transmitting, by the one or more computing device processors, at least one merchant incentive to at least one merchant for processing the purchase using the at least one single-use electronic token; and deleting, by the one or more computing device processors, the at least one single-use electronic token from the accessed digital wallet stored (i) in the at least one database or (ii) in the memory of the mobile device, based on executing the purchase using the at least one single-use electronic token.

8. A non-transitory computer-readable medium containing instructions that when executed by a processor cause the processor to perform the steps of:

receiving a request from a mobile device of a user to download an application;

downloading the requested application to the mobile device of the user;

accessing, by the downloaded requested application, a digital wallet;

storing the accessed digital wallet (i) in at least one database or (ii) in a memory of the mobile device;

associating at least one single-use electronic token with the accessed digital wallet and storing the at least one single-use electronic token in the accessed digital wallet stored (i) in the at least one database or (ii) in the memory of the mobile device;

authenticating the at least one single-use electronic token;

receiving, by the downloaded requested application, access to an application programming interface;

determining, by the application programming interface, other digital wallets located on the mobile device;

receiving, by the application programming interface, access to the determined other digital wallets located on the mobile device;

accessing, by the application programming interface, the determined other digital wallets located on the mobile device;

retrieving, by the application programming interface, information related to the determined other digital wallets located on the mobile device;

identifying, by the application programming interface, initiation of a purchase having a first purchase price by the user;

determining one or more offers for using the at least one single-use electronic token associated with the accessed digital wallet based on the retrieved information from the determined other digital wallets located on the mobile device;

associating at least one user incentive of the one or more offers with the at least one single-use electronic token;

storing the one or more offers that are associated with the at least one single-use electronic token in the at least one database;

transmitting, via the application programming interface, the one or more offers from the at least one database to the downloaded requested application on the mobile device;

presenting the one or more offers to the user on a display of the mobile device, by the downloaded requested application;

receiving, by the downloaded requested application, from the user, an acceptance of the at least one user incentive from the one or more offers that completes the purchase using the at least one single-use electronic token associated with the accessed digital wallet;

executing the purchase using the at least one user incentive and the at least one single-use electronic token associated with the accessed digital wallet;

transmitting at least one merchant incentive to at least one merchant for processing the purchase using the at least one single-use electronic token; and deleting the at least one single-use electronic token from the accessed digital wallet stored (i) in the at least one database or (ii) in the memory of the mobile device, based on executing the purchase using the at least one single-use electronic token.

9. The computer-implemented method of claim 7, further comprising transmitting, by the one or more computing device processors, the at least one merchant incentive to the at least one merchant by decreasing a payment interchange assessment associated with the purchase being made by the user based on processing a payment using the at least one single-use electronic token associated with the accessed digital wallet.

10. The computer-implemented method of claim 7, wherein presenting, by the one or more computing device processors, the one or more offers comprises presenting a rewards points incentive for the user.

11. The computer-implemented method of claim 10, further comprising crediting, by the one or more computing device processors, one or more rewards points to a rewards account associated with the accessed digital wallet based on processing a payment using the at least one single-use electronic token associated with the accessed digital wallet.

12. The computer-implemented method of claim 7, further comprising receiving, by the one or more computing device processors, permission from the user to access the information related to the determined other digital wallets located on the mobile device, where the other digital wallets are not associated with a digital wallet provider maintaining the accessed digital wallet.

13. The computer-implemented method of claim 12, further comprising accessing, by the one or more computing device processors, the at least one other digital wallet and retrieving pricing information related to the at least one other digital wallet.

14. The non-transitory computer-readable medium of claim 8, wherein the instructions when executed by the processor cause the processor to transmit the at least one merchant incentive to the at least one merchant by decreasing a payment interchange assessment associated with the purchase being made by the user based on processing a payment using the at least one single-use electronic token associated with the accessed digital wallet.

15. The non-transitory computer-readable medium of claim 8, wherein presenting the one or more offers comprises presenting a rewards points incentive for the user.

16. The non-transitory computer-readable medium of claim 15, wherein the instructions when executed by the processor cause the processor to credit one or more rewards points to a rewards account associated with the accessed digital wallet based on processing a payment using the at least one single-use electronic token associated with the accessed digital wallet.

17. The non-transitory computer-readable medium of claim 8, wherein the instructions when executed by the processor cause the processor to receive permission from the user to access the information related to the determined other digital wallets located on the mobile device, where the determined other digital wallets are not associated with a digital wallet provider maintaining the digital wallet.

18. The non-transitory computer-readable medium of claim 17, wherein the instructions when executed by the processor cause the processor to access the determined other digital wallets and retrieve pricing information related to the determined other digital wallets.

\* \* \* \* \*